US011574388B2

United States Patent
Gupta et al.

(10) Patent No.: US 11,574,388 B2
(45) Date of Patent: Feb. 7, 2023

(54) AUTOMATICALLY CORRECTING EYE REGION ARTIFACTS IN DIGITAL IMAGES PORTRAYING FACES

(71) Applicant: Adobe Inc., San Jose, CA (US)

(72) Inventors: Angad Kumar Gupta, Ghaziabad (IN); Sourabh Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 112 days.

(21) Appl. No.: 17/136,508

(22) Filed: Dec. 29, 2020

(65) Prior Publication Data
US 2022/0207662 A1 Jun. 30, 2022

(51) Int. Cl.
*G06T 5/00* (2006.01)
*G06T 7/90* (2017.01)
(Continued)

(52) U.S. Cl.
CPC ............ *G06T 5/005* (2013.01); *G06T 5/002* (2013.01); *G06T 7/13* (2017.01); *G06T 7/90* (2017.01); *G06V 10/56* (2022.01); *G06V 10/751* (2022.01); *G06V 40/171* (2022.01); *G06V 40/172* (2022.01); *G06T 2200/24* (2013.01); *G06T 2207/10024* (2013.01); *G06T 2207/30201* (2013.01)

(58) Field of Classification Search
CPC ......... G06T 5/00–50; G06T 7/13; G06T 7/90; G06T 2200/24; G06T 2207/10024; G06T 2207/30201; G06V 10/56; G06V 10/751; G06V 40/171; G06V 40/172
See application file for complete search history.

(56) References Cited

U.S. PATENT DOCUMENTS

2013/0216154 A1\* 8/2013 Li .................. G06V 40/193
382/274
2017/0262970 A1\* 9/2017 Chen .................. G06V 20/10
(Continued)

OTHER PUBLICATIONS

PiXimperfect; YouTube; "Naturally Remove Dark Circles with FS in Photoshop"; Aug. 29, 2018; https://www.youtube.com/watch?v=ax6Ao5VMZI0.
(Continued)

*Primary Examiner* — Sean T Motsinger
(74) *Attorney, Agent, or Firm* — Keller Preece PLLC

(57) ABSTRACT

Methods, systems, and non-transitory computer readable media are disclosed for automatically, accurately, and efficiently correcting eye region artifacts including dark eye regions and wrinkles within a digital image portraying a human face. In particular, in one or more embodiments the disclosed systems localize areas within a digital image to identify eye region artifacts including dark eye regions and wrinkles. In one or more embodiments, the disclosed systems generate a corrected color image by correcting dark eye regions in a low frequency layer of the digital image by replacing the dark eye regions with candidate eye regions. Furthermore, in one or more embodiments the disclosed systems generate a corrected texture image by correcting wrinkles in a high frequency layer by processing the digital image utilizing a smoothing algorithm. The disclosed systems further generate a corrected digital image by combining the corrected color image and the corrected texture image.

20 Claims, 17 Drawing Sheets

(51) Int. Cl.
*G06T 7/13* (2017.01)
*G06V 10/56* (2022.01)
*G06V 10/75* (2022.01)
*G06V 40/16* (2022.01)

(56) References Cited

U.S. PATENT DOCUMENTS

| | | | |
|---|---|---|---|
| 2018/0047186 A1* | 2/2018 | Sato | G06T 11/60 |
| 2018/0174370 A1* | 6/2018 | Chen | G06T 7/90 |
| 2019/0035062 A1* | 1/2019 | Sokeila | H04N 5/2354 |
| 2019/0385290 A1* | 12/2019 | Yang | G06T 5/009 |
| 2020/0043213 A1* | 2/2020 | Bao | G06T 11/001 |
| 2022/0207662 A1* | 6/2022 | Gupta | G06V 40/171 |

OTHER PUBLICATIONS

Dani Diamond; YouTube; "How To Remove Bags Under Eyes Using Curves Using Photoshop"; Mar. 13, 2014; https://www.youtube.com/watch?v=3IL8XUUWg_Q.

Stefan Lindblad; YouTube; "Corel Photo-Paint Remove loose bags under eyes, image retouching by Stefan Lindblad"; Jul. 9, 2015; https://www.youtube.com/watch?v=ZxvtfogmKp8.

RetouchMe: Photo editing by real designers; "Remove puffy eyes" Date downloaded Jan. 14, 2021; https://retouchme.com/service/eye-bag-remover/.

\* cited by examiner

700

Slide Down The Dark Eye Region By A Set Number Of Pixels 702

Determine A Color For The Potential Candidate Replacement Region 704

= [ 237, 200, 121 ]

Determine If Difference Between The Average Color Of Potential Candidate Replacement Region And The Average Sample Color Satisfies A Threshold Candidate Color Value 706

AUTOMATICALLY CORRECTING EYE REGION ARTIFACTS IN DIGITAL IMAGES PORTRAYING FACES

BACKGROUND

Recent years have seen a significant improvement in hardware and software platforms for capturing and editing digital images. Indeed, conventional systems can modify, retouch, or otherwise edit digital images that portray human faces to generate enhance digital images. To illustrate, conventional systems can edit facial features within digital images to remove red eyes, remove spots or blemishes, and reshape facial structures.

Despite these advances, conventional systems still have several shortcomings, particularly with regard to the accuracy, efficiency, and flexibility of implementing computing devices. For instance, in addressing visual artifacts around the eyes in digital images portraying human faces, many conventional systems inaccurately produce digital images that appear unnatural and artificial. For example, to modify wrinkles or dark regions under a human eye, conventional systems rely on voluminous user inputs via graphical user interfaces to generate retouched images. Using a process that relies heavily on user interface interactions and selections often results in digital images that include artifacts and other inaccuracies. For instance, in applying existing correction tools and processes, it is common for conventional systems that rely on user interaction with user interfaces to misidentify a correction region, erroneously apply a series of correction tools, perform digital image modification steps in an incorrect order, and/or select inappropriate colors and other parameters for correcting artifacts. Thus, conventional systems often produce inaccurate retouched images that appear unnatural or contain visual artifacts.

Additionally, conventional image editing systems are often inefficient. For example, to correct dark eyes or wrinkles from a face within a digital image, conventional systems require significant user interactions and time (e.g., through repeated selection and application of mouse input-based tools). Indeed, conventional systems can require user interaction with dozens of different tools (that are often imprecise and difficult to use) in addition to modifications to multiple different digital image layers to correct digital image defects. Thus, conventional systems waste substantial computing resources in detecting, displaying, and correcting artifacts within digital images.

Conventional systems also suffer from inflexibility in generating enhanced digital images. Indeed, the voluminous user interactions and selections required by conventional systems can make it difficult or impossible to perform retouching operations using hand-held devices such as smart phones or tablets (e.g., due to the lack of screen space). Accordingly, conventional systems often rigidly require correction of digital images to be performed on traditional desktop computers with traditional input devices (e.g., a computer mouse). As many photographs are captured using handheld devices, conventional systems often require users to transfer images to other devices in order to correct images with eye region artifacts. Thus, conventional systems often require the use of additional computing and communication resources to transfer image files between handheld devices and traditional desktop computers.

These, along with additional problems and issues exist in image editing systems.

BRIEF SUMMARY

One or more embodiments provide benefits and/or solve one or more problems in the art with systems, methods, and non-transitory computer readable storage media that automatically, accurately, and efficiently generate enhanced digital images that correct eye region artifacts in digital images portraying human faces. For example, the disclosed systems automatically detect eye region artifacts including under eye darkness and eye bags or wrinkles in digital images and generate enhanced digital images with corrected sub-eye regions. To illustrate, the disclosed systems utilize facial landmark detection algorithms and a color matching process to automatically localize a region below the eyes in digital images that may contain artifacts. In addition, the disclosed systems automatically determine a skin sampling area to remove skin darkness inside dark eye regions and fix dark eye skin color to match a natural facial skin color portrayed within the digital image. Furthermore, the disclosed systems can automatically fix eye bags and wrinkles based on unique characteristics of an individual portrayed in a digital image (such as based on gender and age factors) to generate an enhanced digital image customized to the characteristics of the individual portrayed in the digital image. The disclosed systems can perform these operations automatically (e.g., without user input) to efficiently, accurately, and flexibly remove sub-eye region artifacts from digital images across a variety of client devices (including mobile devices).

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
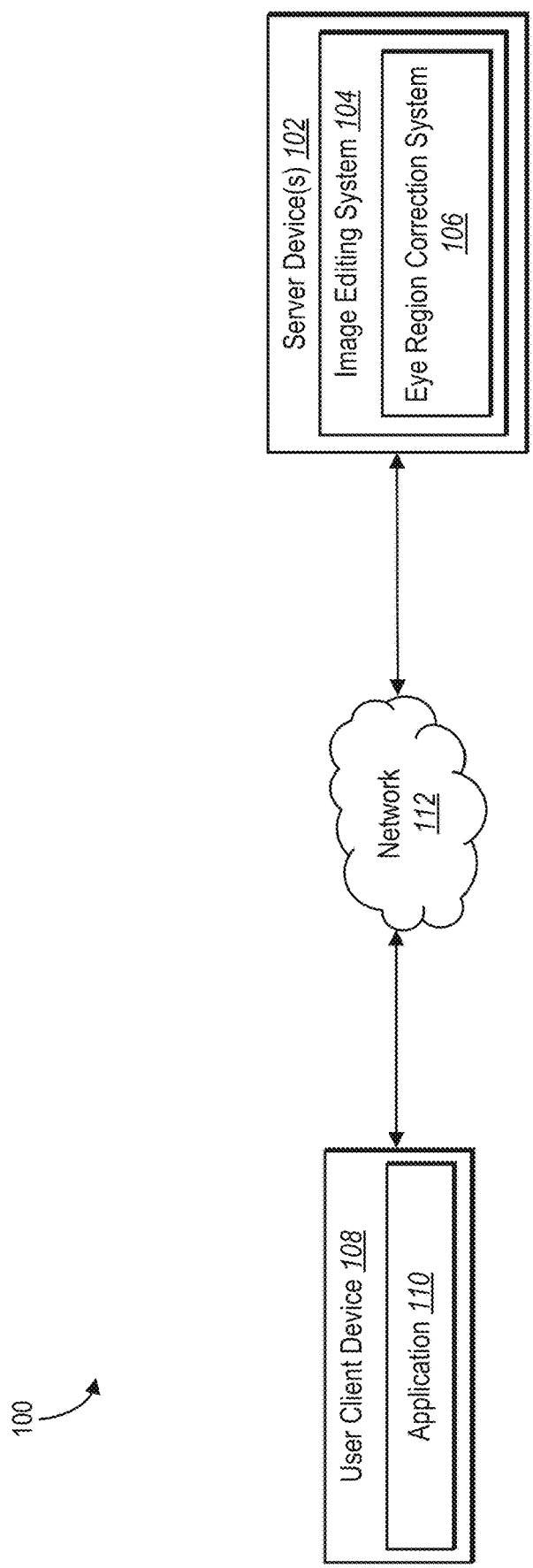
FIG. 1 illustrates an environment in which an image editing system can operate in accordance with one or more embodiments of the present disclosure.

One or more embodiments of the present disclosure includes an eye region correction system that automatically, accurately, and efficiently identifies, localizes, and corrects eye region artifacts in digital images portraying human faces. In particular, in one or more embodiments the eye region correction system identifies and corrects dark eye circles and/or eye bags and wrinkles from sub-eye regions of faces portrayed within digital images. For example, the eye region correction system utilizes a facial landmark detection algorithm to identify a sub-eye region and sampling correction area within a face portrayed within a digital image. The eye region correction system then determines a dark eye region and wrinkles portrayed within the sub-eye region by applying a color matching algorithm relative to the sampling correction area and an edge detection algorithm. The eye region correction system further corrects the various eye region artifacts. For instance, the eye region correction system corrects textural artifacts such as wrinkles and eye bags by processing a high frequency texture layer of a digital image and applying a smoothing algorithm tailored to the unique characteristics (such as age and gender) of the individual portrayed within the digital image. Additionally, the eye region correction system corrects color artifacts such as dark eye regions by processing a low frequency color layer of the digital image and replacing a dark eye region with an intelligently sampled replacement region of the digital image. The eye region correction system can further generate a corrected digital image that accurately and efficiently removes wrinkles and dark eye colors by combining corrected low frequency and high frequency layers.

As just mentioned, in one or more embodiments, the eye region correction system determines a sub-eye region of a digital image. For example, the eye region correction system utilizes a facial landmark detection algorithm to generate sub-eye landmark points for a face portrayed within a digital image. The eye region correction system demarcates a sub-eye region based on the generated sub-eye landmark points.

Additionally, in one or more embodiments the eye region correction system determines a sampling area in a digital image. For example, the eye region correction system identifies a sampling area on the face that includes a target or expected color for the sub-eye region. In one example, the eye region correction system determines the sampling area based on the facial landmarks. For instance, the eye region correction system designates areas around sampling landmark points as a sampling area and then determines a color (e.g., an average color) of the sampling area.

Moreover, in one or more embodiments the eye region correction system analyzes the sub-eye region to determine a more specific dark eye region. For example, the eye region correction system compares the determined color of the sampling area with pixels in the sub-eye region. In one example, the eye region correction system utilizes a color matching algorithm with a configurable color difference threshold within the sub-eye region to determine a dark eye region. More specifically, the eye region correction system identifies one or more dark eye regions with colors that diverge from the color of the sampling area by the color difference threshold.

Upon determining a dark eye region, the eye region correction system can also correct the dark eye region. For example, the eye region correction system determines a candidate replacement region from the digital image. In some embodiments, the eye region correction system identifies a candidate replacement region by sampling the digital image utilizing the dark eye region and the color of the sampling area. In one example, the candidate replacement region comprises a region that matches the same size and shape of the dark eye region. In some embodiments, the eye region correction system samples various regions of the face to identify a candidate replacement region with an average skin color that matches the color of the sampling area within a configurable threshold. Furthermore, the eye region correction system selects a candidate replacement region based on determining that the candidate replacement region does not contain artifacts such as moles, scars, or other artifacts.

The eye region correction system corrects a dark eye region artifact by replacing the dark eye region with a candidate replacement region. Upon replacing the dark eye region with the candidate replacement region, the eye region correction system smooths a path around the candidate replacement region for seamless blending. Furthermore, the eye region correction system utilizes different parameters including diffusion, fidelity, and adaptation to customize how the candidate replacement region blends into the surrounding image.

As mentioned, the eye region correction system also automatically identifies textural eye region artifacts such as eye wrinkles. In particular, the eye region correction system generates eye wrinkle contours for wrinkle edges identified within the sub-eye region. In some embodiments, the eye region correction system utilizes an edge detection algorithm to identify wrinkle edges. The eye region correction system further performs morphological operations to generate closed contours (i.e., eye wrinkle contours) for each identified wrinkle edge.

The eye region correction system further determines and utilizes a correction size for each eye wrinkle contour. In one example, the eye region correction system determines a maximum width of an eye wrinkle contour. By determining correction sizes unique to each eye wrinkle contour, the eye region correction system accurately identifies and corrects wrinkle contours. In particular, the eye region correction system corrects the wrinkles by processing the eye wrinkle contours by utilizing a smoothing algorithm and a correction size. In some embodiments, the eye region correction system utilizes a smoothing algorithm on an area based on the correction size.

As briefly described above, in some embodiments the eye region correction system utilizes different methods to correct dark eye regions and eye wrinkles within the same digital image. In one or more embodiments, the eye region correction system separates a digital image into different layers and applies different algorithms to the layers to correct different artifacts. For example, the eye region correction system generates a high frequency image reflecting a texture layer and a low frequency image reflecting a color layer of the digital image. In one example, the eye region correction system generates the low frequency image by processing the digital image utilizing a blur algorithm. The eye region correction system further generates the high frequency image by separating the low frequency image from the digital image.

In one or more embodiments, the eye region correction system corrects textural eye region artifacts utilizing the high frequency image and color eye region artifacts utilizing the low frequency image. In particular, the eye region correction system generates a corrected texture image by smoothing pixels along eye wrinkle contours of a high frequency image. More specifically, the eye region correction system utilizes the smoothing algorithm described previously to correct eye wrinkle contours of the high frequency image. Additionally, the eye region correction system generates a corrected color image by replacing dark eye regions with candidate replacement regions of the low frequency image. For instance, the eye region correction system performs processes described above with respect to correcting dark eye regions on the low frequency image. The eye region correction system generates a final corrected digital image by combing the corrected texture image and the corrected color image.

As mentioned above, the eye region correction system can uniquely tailor modifications to a digital image based on the characteristics of an individual portrayed within the digital image. For example, the eye region correction system changes parameters for generating corrected digital images based on determining a classification for a face of a digital image. To illustrate, the eye region correction system determines a classification that includes an age and/or a gender of a face. The eye region correction system changes parameters for correcting eye image artifacts based on the classification. For instance, based on determining a classification of female in a particular age range, the eye region correction system selects a different smoothing parameter to tailor the correction to the particular gender and age range. By adjusting corrections based on classifications, the eye region correction system generates more realistic corrected digital images.

As previously mentioned, the eye region correction system can provide numerous advantages, benefits, and practical applications over conventional systems. For example, the eye region correction system can improve accuracy and flexibility relative to conventional systems. Indeed, the eye region correction system can generate corrected digital images that are more realistic and natural compared to images retouched using conventional systems. In particular, the eye region correction system can generate more accurate results by automatically identifying dark eye regions and eye bags/wrinkles, separating digital images into different layers, identifying candidate replacement regions for dark eye regions, intelligently smoothing eye bags and eye wrinkles, and combining modified digital image layers. Furthermore, the eye region correction system can flexibly generate corrected digital images specific to unique user characteristics based on generating classifications for faces of digital images. Thus, the eye region correction system generates corrected digital images that are more realistic when compared to images retouched using conventional systems.

Moreover, the eye region correction system improves efficiency relative to conventional systems. In particular, the eye region correction system significantly reduces user interactions, user interfaces, time, and processing recourses required by many conventional systems to retouch or edit images containing eye region artifacts. For instance, instead of relying on excessive input-based tools to select, segment, remove, and replace regions within a face, the eye region correction system intelligently identifies and corrects artifacts within sub-eye regions of a digital image. Indeed, the eye region correction system can generate enhanced digital images with minimal user interactions (e.g., one selection of a single user interface element) with significantly reduced time and computing power.

In addition to the foregoing, the eye region correction system improves the flexibility and efficiency of computing devices by operating on a variety of client devices. Indeed, because the eye region correction system does not require voluminous/precise user interactions or selection via user interfaces, the eye region correction system can flexibly operate on hand-held devices, such as smartphones or tablets. Moreover, the eye region correction system largely obviates the need of most conventional systems to transfer digital images from mobile hand-held devices to traditional desktop computers for image retouching purposes.

As illustrated by the foregoing discussion, the present disclosure utilizes a variety of terms to describe features and advantages of the eye region correction system. Additional detail will now be provided regarding the meaning of such terms. For example, as used herein, the term "digital image" refers to a computer representation of visual content. Accordingly, a digital image includes a digital graphics file that, when rendered, displays one or more objects. For example, an input image comprises a digital photograph captured by a camera that portrays one or more faces. In some circumstances, a digital image includes a face with one or more eye region artifacts such as a dark eye region, wrinkles, or under-eye bags. Additionally, in some embodiments, a digital image comprises a frame in a digital video.

As used herein, the term "sub-eye region" refers to the area of a face below an eye. In particular, a sub-eye region can refer to an area under the eye in which eye region artifacts are found. For example, a sub-eye region can be defined by facial landmarks. In one or more embodiments, a sub-eye region comprises a polygon whose edges are defined by facial landmark points on the nose and lower eyelid.

As used herein, the term "sampling area" refers to a region of a face portrayed in a digital image. For example, a sampling area can include a region of a digital image that includes pixels of a sample color. More specifically, a sampling area includes a color expected to be found in the sub-eye region (if the sub-eye region did not have a dark eye region). For instance, the sampling area may comprise one or more regions on a nose of a face within a digital image.

As used herein, the term "facial landmarks" refers to a set of points on a human face within a digital image. In particular, facial landmarks indicate an estimation of locations of various facial features. For example, facial landmarks comprise coordinate data and local feature values indicating locations along a face's eyebrows, eyes, nose, lips, and various contour points of various parts of a face portrayed within a digital image.

As used herein, the term "facial landmark detection algorithm" (or simply "landmark detection algorithm") refers to an algorithm that locates facial landmarks. In particular, a facial landmark detection algorithm comprises an algorithm that locates key points on a face such as points along eyebrows, eyes, nose, lips, and various contour points of various parts of a face. A facial landmark detection algorithm outputs facial landmarks corresponding to a face within a digital image. For example, in some embodiments, a facial landmark detection algorithm comprises a True Vision Solutions (TVS) landmark feature tracker. In other embodiments, a facial landmark detection algorithm comprises deep learning methods that employ convolutional neural network (CNN) models that detect facial landmarks.

As used herein, the term "dark eye region" refers to an area under an eye that is darker than surrounding skin/pixels. In particular, a dark eye region refers to pixels within a sub-eye region of a digital image that includes pixels that are darker than pixels in a surrounding area. For example, a dark eye region can include dark circles under an eye that are captured in a digital image portraying a face.

As used herein, the term "candidate replacement region" refers to an area within a digital image including candidate or possible replacement pixels for another region. In particular, a candidate replacement region comprises an area of pixels within a digital image that will replace pixels in a dark eye region in the same digital image. For instance, in one or more embodiments, a candidate replacement region is the same shape and size as a corresponding dark eye region. In one example, a candidate replacement region comprises a patch of pixels located on the cheek of a face portrayed within a digital image.

As used herein, the term "corrected digital image" refers to a digital image in which eye region artifacts have been modified or corrected. In particular, a corrected digital image comprises a digital image that has modified/corrected dark eye regions and/or eye wrinkles. For example, a corrected digital image comprises an image portraying a face with fewer or no eye wrinkles and less dramatic or no dark eye regions when compared with a digital image.

As used herein, the term "eye wrinkle contour" refers to a boundary, edge, or region of a digital image that forms the shape of a wrinkle. In particular, an eye wrinkle contour refers to a closed outline that bounds a wrinkle edge on a face portrayed within a digital image. For example, a wrinkle contour can comprise a closed outline around a wrinkle or an eye bag within a digital image.

As used herein, the term "edge detection algorithm" refers to an algorithm that identifies edges or discontinuities within images. In particular, an edge detection algorithm identifies wrinkle edges associated with wrinkles and eye bags within a digital image. For example, an edge detection algorithm may comprise various edge detection algorithms such as a Canny edge detection algorithm, a Deriche edge detection algorithm, or various other edge detection algorithms.

As used herein, the term "correction size" refers to dimensions associated with correcting a wrinkle contour. In particular, a correction size comprises an area or size for applying a smoothing algorithm. For instance, in one or more embodiments, the correction size comprises a size for applying a smoothing brush, where the size corresponds to a maximum dimension (e.g., a maximum width) of a wrinkle contour. In one or more embodiments, each wrinkle contour is associated with a correction size.

As used herein, the term "smoothing algorithm" refers to an algorithm for smoothing edges or discontinuities within a digital image. In particular, a smoothing algorithm reduces or removes wrinkle contours within a digital image portraying a face. For example, in some embodiments, a smoothing algorithm comprises a process (e.g., utilization of a spot healing brush tool) that reduces or removes wrinkle contours in a digital image.

As used herein, the term "high frequency image" refers to an image in which intensity data changes rapidly on a short distance scale across a digital image. In particular, high frequency images represent rapid changes in intensity such as edges within a digital image. For example, creating a high frequency image can involve applying an algorithm or other process to a digital image. Furthermore, a high frequency image can indicate texture within a digital image such as wrinkle edges. In one or more embodiments, the eye region correction system creates a high frequency image by removing a low frequency layer from a digital image.

As used herein, the term "low frequency image" refers to an image reflecting low spatial frequency among spatial frequency components contained within a digital image. In particular, a low frequency image comprises an image that indicates areas where changes take place slowly across a large area of a digital image. For instance, a low frequency image indicates gradual changes of color tones within a digital image without indicating rapid changes, edges, or textures within the digital image. For example, a low frequency image may comprise an image with blurred colors of a digital image.

As used herein, the term "corrected texture image" refers to an image that has been processed to modify/correct textural artifacts. In particular, a corrected texture image comprises an image in which wrinkle edge contours have been corrected (e.g., lessened or removed). For instance, in some embodiments, a corrected texture image comprises a high frequency image that contains fewer wrinkle contours than an original digital image.

As used herein, the term "corrected color image" refers to an image that has been processed to modify/correct color artifacts. In particular, a corrected color image comprises an image in which dark eye regions have been corrected (e.g., lessened or removed). For instance, in some embodiments, a corrected color image comprises a high frequency image that contains reduced or removed dark eye regions when compared with an original digital image.

The following disclosure provides additional detail regarding the eye region correction system in relation to illustrative figures portraying example embodiments and implementations of the eye region correction system. For example, FIG. 1 illustrates a schematic diagram of a system environment (or "environment") 100 in which an eye region correction system 106 operates in accordance with one or more embodiments. As illustrated in FIG. 1, the environment 100 includes server device(s) 102, a network 112, and a user client device 108.

While FIG. 1 shows an embodiment of the eye region correction system 106, alternative embodiments and configurations are possible. For instance, in one or more embodiments, the environment 100 includes a different number of client devices, servers, or other components in communication with the eye region correction system 106 via the network 112. In another example, the server device (s) 102 represent a set of connected server devices. As a further example, the user client device 108 communicates directly with the server device(s) 102, bypassing the network 112 or utilizing a separate and/or additional network.

In some embodiments, the server device(s) 102, the network 112 and the user client device 108 are communicatively coupled with each other either directly or indirectly. For example, and as shown in FIG. 1, the server device(s) 102 and the user client device 108 are connected via the network 112. Each of the components of the environment 100 communicate via the network 112. The network 112 comprises any suitable network over which computing devices can communicate. Example networks are discussed in additional detail below in relation to FIG. 16.

As illustrated in FIG. 1, the environment 100 includes the server device(s) 102. The server device(s) 102 generate, store, receive, and transmit digital content including software hosted at the server device(s) 102, digital video, digital images, digital audio, digital designs, metadata, etc. In particular, the server device(s) 102 receive, manage, and modify digital images. For instance, in some embodiments, the server device(s) 102 receive digital images portraying faces with eye region artifacts. In some embodiments, the server device(s) 102 correct or otherwise modify the digital images and transmit the digital images to the user client device 108. In some embodiments, the server device(s) 102 comprises a data server. Additionally, or alternatively, the server device(s) 102 comprises a communication server or a web-hosting server.

As further shown in FIG. 1, the server device(s) 102 includes an image editing system 104. Generally, the image editing system 104 facilitates the modification of digital images within applications. In one example, the image editing system 104 provides tools for editing digital images in real time. For example, the image editing system 104 provides filters and other image manipulation tools. Moreover, the image editing system 104 operates in connection with one or more applications to generate or modify images.

As illustrated in FIG. 1, the image editing system 104 includes the eye region correction system 106. As described in additional detail below, the eye region correction system 106 automatically determines dark eye regions and/or eye wrinkle contours within digital images portraying faces. In one or more embodiments, the eye region correction system 106 determines a sub-eye region within a digital image. The eye region correction system 106 further determines whether the sub-eye region includes a dark eye region or wrinkles. Upon identifying a dark eye region, the eye region correction system 106 identifies a candidate replacement region on the face and replaces the dark eye region with the candidate replacement region. In some examples, based on detecting wrinkles within the sub-eye region, the eye region correction system 106 generates corresponding wrinkle contours, determines correction sizes for each of the wrinkle contours, and utilizes a smoothing algorithm to process the digital image.

In one or more embodiments, the eye region correction system 106 automatically generates a corrected digital image. To illustrate, the eye region correction system 106 separates a color and texture layer from the digital image and corrects dark eye regions and wrinkle contours in separate layers. For example, the eye region correction system 106 generates a high frequency image and a low frequency image corresponding to the digital image. The eye region correction system 106 further generates a corrected texture image by smoothing pixels along an eye wrinkle contour of the high frequency image and generates a corrected color image by replacing the dark eye region with a candidate replacement region of the low frequency image. The eye region correction system 106 further combines the high frequency image and the low frequency image to generate a corrected digital image.

As illustrated in FIG. 1, the environment 100 includes the user client device 108. The user client device 108 generates, stores, receives, and sends digital data. For example, the user client device 108 communicates with the server device(s) 102 via the network 112. The user client device 108 illustrated in FIG. 1 comprises various types of client devices. For example, in some embodiments, the user client device 108 comprises mobile devices such as laptops, tablets, mobile telephones, smartphones, etc. In other embodiments, the user client device 108 includes non-mobile devices, such as desktops or servers, or other types of client devices. Additional details with regard to the user client device 108 are discussed below with respect to FIG. 16.

In some embodiments, the user client device 108 is associated with a user of an image editing program provided by the image editing system 104. Generally, the user client device 108 receives, from the server device(s) 102 and via the network 112, data utilized in digital image processing. For example, the user client device 108 receives data including algorithms or other systems by which to generate corrected digital images.

As further illustrated in FIG. 1, the user client device 108 includes an application 110. In some embodiments, the application 110 comprises a web application or a native application on the user client device 108 (e.g., a mobile application, a desktop application, etc.). As illustrated, the application 110 interfaces with the eye region correction system 106 to provide digital data including graphical user interfaces, user interactions, digital images, and operations. For example, in one or more embodiments, the eye region correction system 106 comprises a mobile application that renders a graphical user interface that includes features and elements for generating and/or modifying digital images. Additionally, the application 110 also renders a graphical user interface for uploading digital images. The application 110 sends and receives data from the eye region correction system 106 and presents, for display at the user client device 108, digital images, corrected digital images, and user interface elements for modifying parameters for generating the corrected digital images.

Although FIG. 1 depicts the eye region correction system 106 located on the server device(s) 102, in some embodiments, the eye region correction system 106 is implemented by (e.g., located entirely or in part) on one or more other components of the environment 100. In one example, the eye region correction system 106 is implemented entirely (or in part) on the user client device 108. For instance, the server device(s) 102 and/or the user client device 108 can have the digital images stored thereon.

Additionally, in some embodiments, the user client device 108 communicates directly with the eye region correction system 106, bypassing the network 112. Moreover, the eye region correction system 106 can access one or more databases (e.g., a digital image database) housed on the server device(s) 102 or elsewhere in the environment 100. Further, in some embodiments, the eye region correction system 106 includes one or more machine learning models (e.g., neural networks). In one or more embodiments, the eye region correction system 106 is implemented in a variety of different ways across the server device(s) 102, the network 112, and the user client device 108.

As mentioned above, the eye region correction system 106 employs machine learning and various neural networks in various embodiments. Machine learning refers to the process of constructing and implementing algorithms that can learn from and make predictions on data. In general, machine learning may operate by building models from example inputs to make data-driven predictions or decisions. Machine learning can include neural networks (e.g., a convolutional neural network, LSTM neural network, generative adversarial neural network, or graph neural network)), decision trees, perceptrons, vector machines, or a combination of networks and models.

Figure 2:
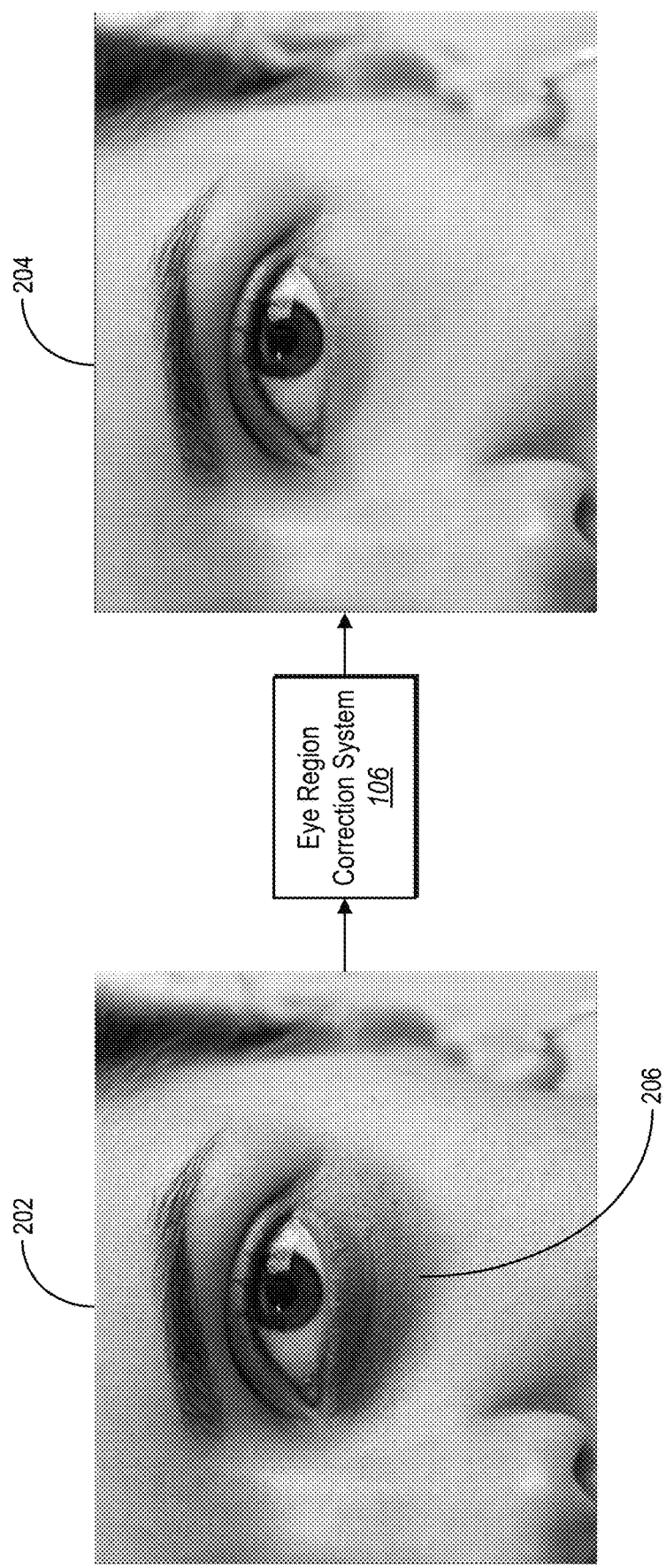
FIG. 2 illustrates an overview diagram of generating a corrected digital image in accordance with one or more embodiments of the present disclosure.

As mentioned above, the eye region correction system 106 can generate an enhanced digital image by correcting dark eye regions and wrinkles/eye bags from a digital image portraying a face. For example, FIG. 2 illustrates the eye region correction system 106 receiving a digital image 202 portraying a face. The eye region correction system 106 processes the digital image 202 to generate a corrected digital image 204.

As illustrated in FIG. 2, the eye region correction system 106 receives a digital image 202. The digital image 202 portrays a face with eye region artifacts. For instance, and as illustrated in FIG. 2, the digital image 202 portrays a face with a dark eye region 206. In one or more embodiments, the digital image 202 portrays a face with eye wrinkles or eye bags in addition or in the alternative to the dark eye region 206.

The eye region correction system 106 processes the digital image 202 to generate the corrected digital image 204. In particular, the eye region correction system 106 corrects eye region artifacts including dark eye regions and eye wrinkles. For instance, as illustrated in FIG. 2, the eye region correction system 106 corrects eye region artifacts and generates the corrected digital image 204 by removing the dark eye region 206. As mentioned, the eye region correction system 106 can further correct eye region artifacts by lessening or removing eye wrinkles.

Figure 3:
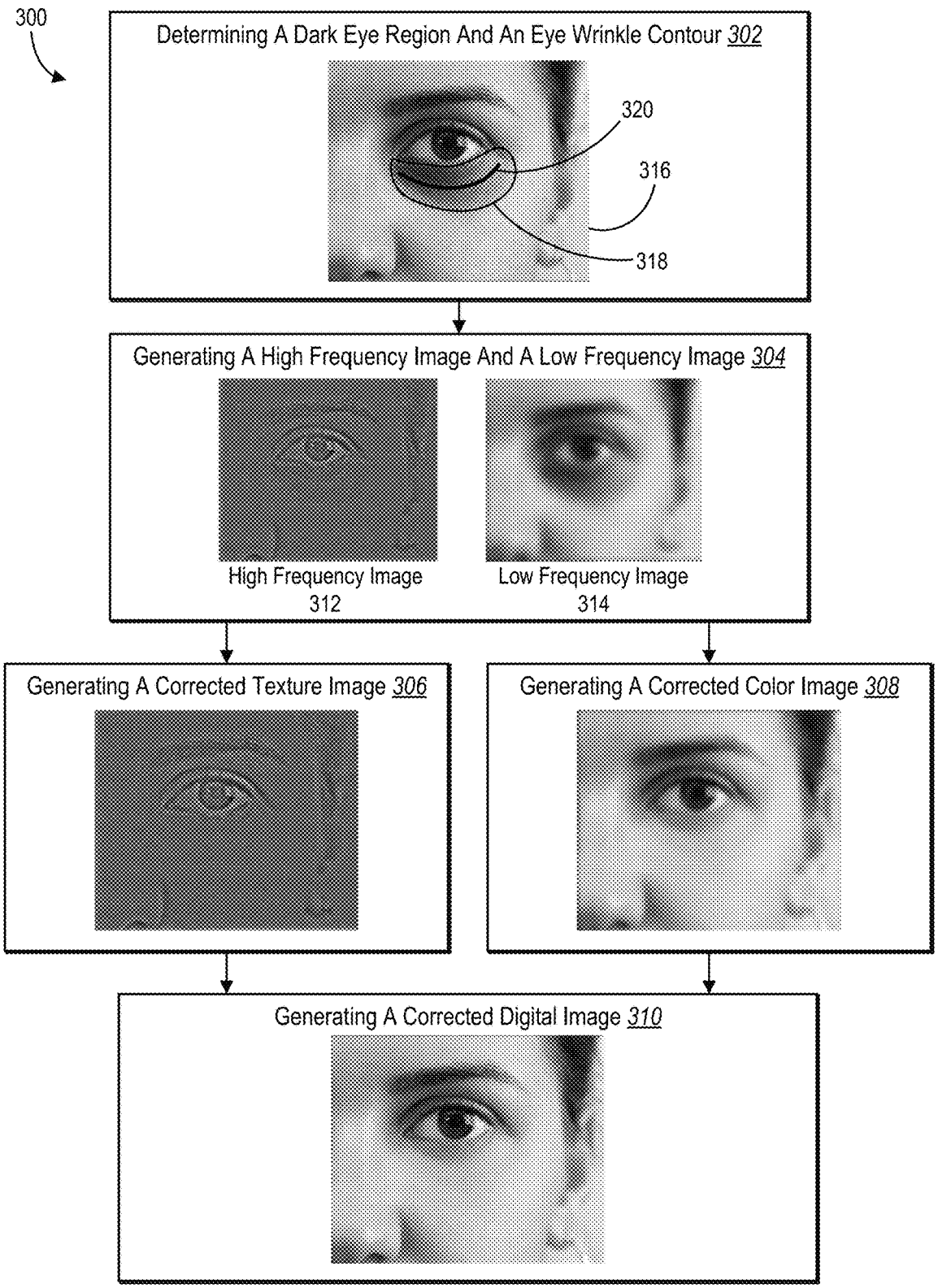
FIG. 3 illustrates an overview diagram of generating a corrected digital image by generating a corrected texture image and a corrected color image in accordance with one or more embodiments of the present disclosure.

FIG. 2 generally illustrates how the eye region correction system 106 generates a corrected digital image in accordance with one or more embodiments. FIG. 3 provides a general overview of acts the eye region correction system 106 performs as part of generating a corrected digital image in accordance with one or more embodiments. FIG. 3 illustrates a series of acts 300 comprising an act 302 of determining a dark eye region and an eye wrinkle contour, an act 304 of generating a high frequency image and a low frequency image, an act 306 of generating a corrected texture image, an act 308 of generating a corrected color image, and an act 310 of generating a corrected digital image.

Figure 5:
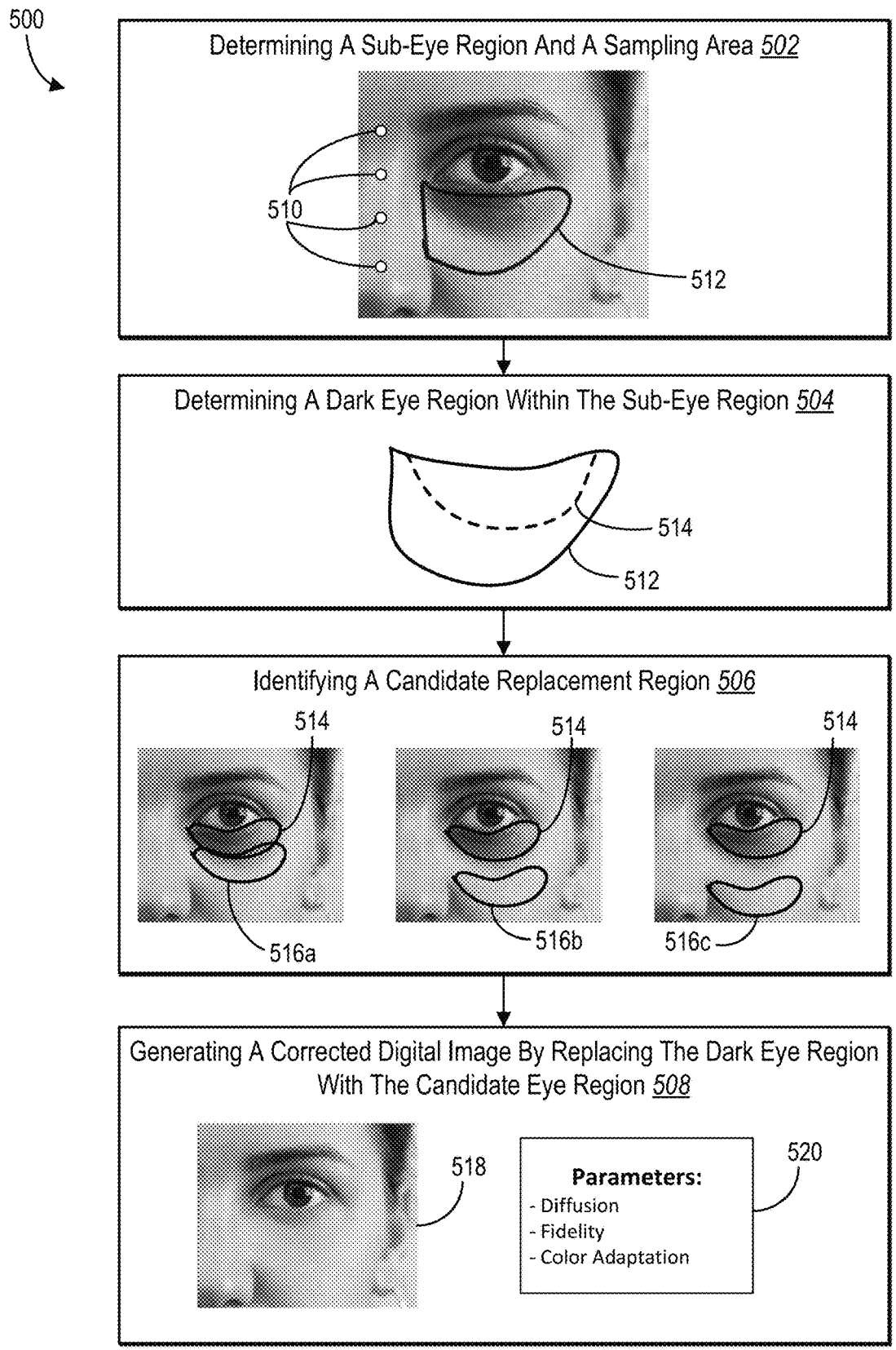
FIG. 5 illustrates an overview diagram of replacing a dark eye region with a candidate eye region in accordance with one or more embodiments of the present disclosure.

As mentioned, the eye region correction system 106 performs the act 302 of determining a dark eye region and an eye wrinkle contour. As shown in FIG. 3, the eye region correction system 106 automatically localizes dark eye regions and wrinkles within a sub-eye region of a digital image 316. In some embodiments, the eye region correction system 106 utilizes different methods to localize different eye region artifacts. For instance, in one example, the eye region correction system 106 utilizes a color matching algorithm to determine a dark eye region 318 within the digital image 316. Additionally, in some embodiments, the eye region correction system 106 utilizes an edge detection algorithm to localize an eye wrinkle contour 320 within the digital image 316. FIG. 5 and FIG. 11 provide additional detail regarding acts the eye region correction system 106 performs to determine the dark eye region 318 and the eye wrinkle contour 320, respectively, in accordance with one or more embodiments.

As further illustrated in FIG. 3, the eye region correction system 106 performs the act 304 of generating a high frequency image and a low frequency image. As mentioned, the eye region correction system 106 corrects various types of eye region artifacts. Generally, the eye region correction system 106 corrects textural artifacts such as an eye wrinkle indicated by the eye wrinkle contour 320 as well as color artifacts such as the dark eye region 318. In order to correct both textural artifacts and color artifacts, the eye region correction system 106 separates the digital image 316 into a high frequency image 312 and a low frequency image 314.

As illustrated in FIG. 3, the eye region correction system 106 generates the low frequency image 312 as part of performing the act 304. As mentioned, the low frequency image 314 indicates gradual changes over a range of pixels within the digital image 316. In some embodiments, the eye region correction system 106 generates the low frequency image 314 by utilizing a blur algorithm. For instance, the eye region correction system 106 blurs the digital image 316 by a Gaussian blur algorithm. The eye region correction system 106 utilizes the Gaussian blur algorithm to smoothen, remove textures from, and average colors of the digital image 316 to create the low frequency image 314. In some embodiments, the eye region correction system 106 utilizes various other blur algorithms to generate the low frequency image 314. For instance, the eye region correction system 106 may utilize a box blur algorithm, an averaging algorithm, median filtering, bilateral filtering, or other type of blur algorithm.

As illustrated in FIG. 3, the eye region correction system 106 generates the high frequency image 312 as part of performing the act 304. The high frequency image 312 indicates the texture within an image and corresponds to the texture layer of the digital image 316. In some embodiments, the eye region correction system 106 creates the high frequency image 312 by subtracting the low frequency image 314 from the digital image 316.

Figure 10:
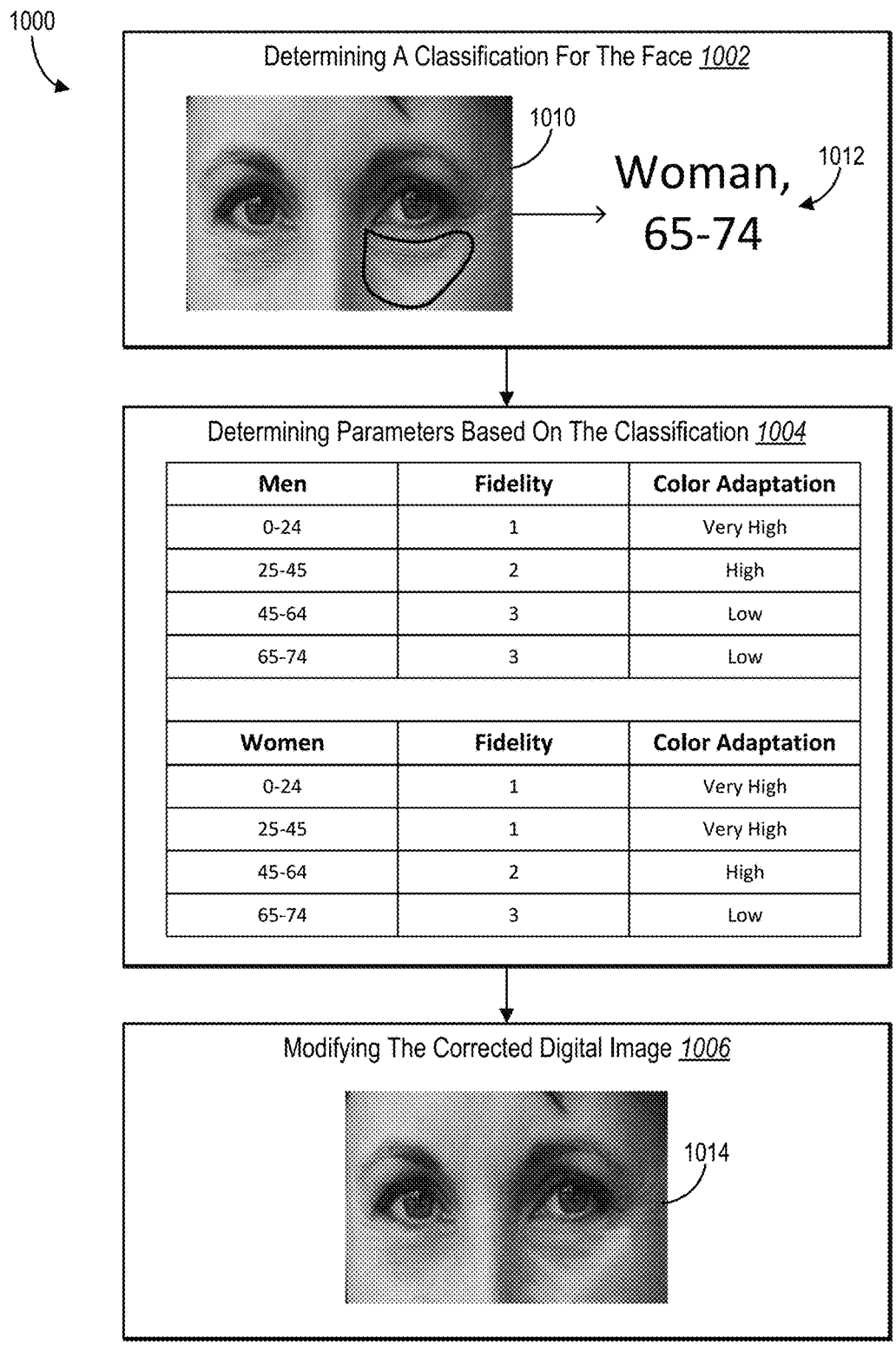
FIG. 10 illustrates a diagram of modifying parameters for generating a corrected digital image based on determined classifications for a face in accordance with one or more embodiments of the present disclosure.

The eye region correction system 106 further performs the act 306 of generating a corrected texture image. Generally, the eye region correction system 106 generates the corrected texture image by smoothing pixels along eye wrinkle contours of the high frequency image 312. In particular, the eye region correction system 106 determines a correction size for each eye wrinkle contour and processes each eye wrinkle contour utilizing a smoothing algorithm and the correction size. For instance, as illustrated in FIG. 3, the corrected texture image includes smoothened wrinkle edges. FIG. 10 and the corresponding discussion provide additional detail with respect to how the eye region correction system 106 smooths pixels along eye wrinkle contours in accordance with one or more embodiments.

Figure 8:
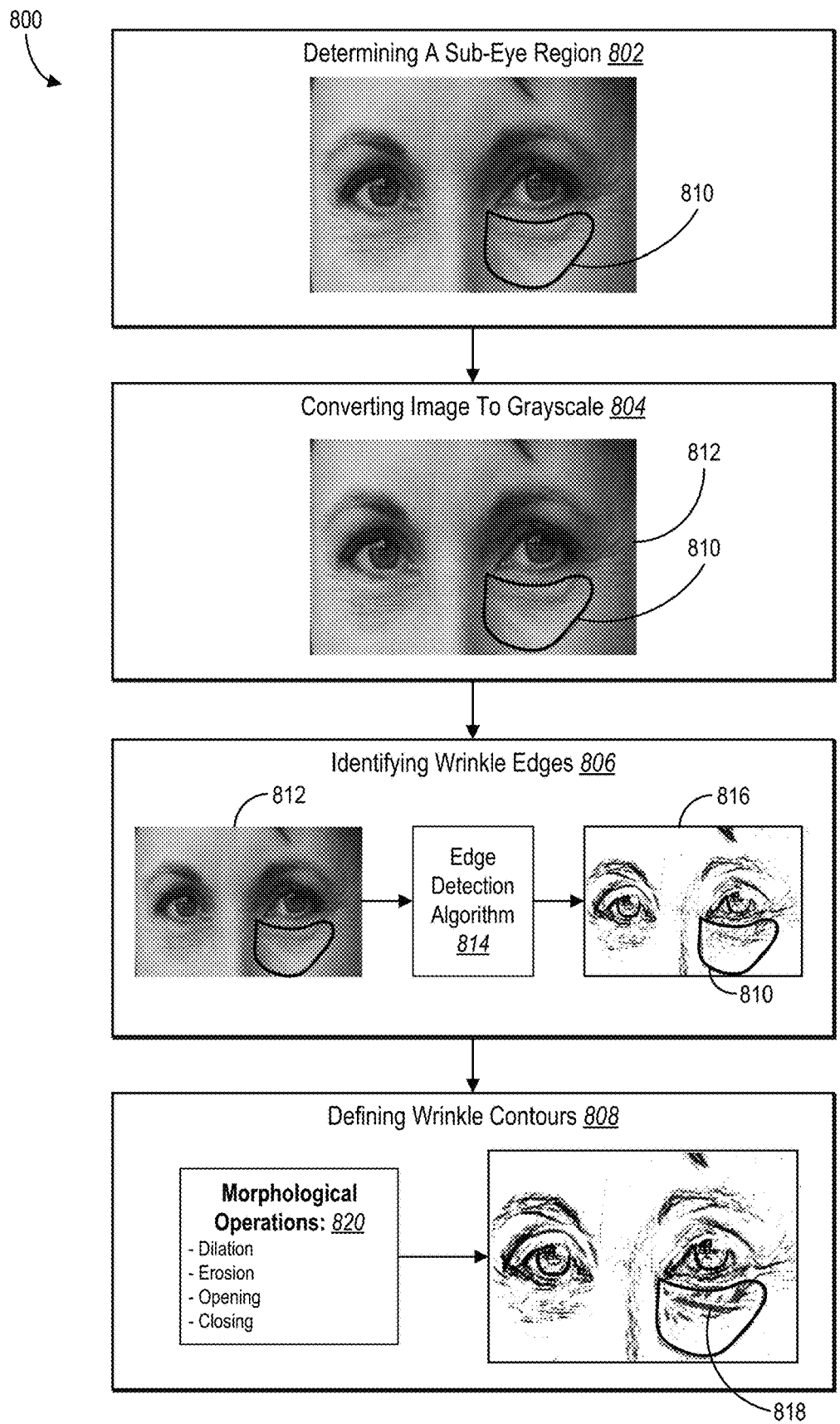
FIG. 8 illustrates a diagram of generating wrinkle contours in accordance with one or more embodiments of the present disclosure.

As further illustrated in FIG. 3, the eye region correction system 106 performs the act 308 of generating a corrected color image. Generally, the eye region correction system 106 generates the corrected color image by replacing the dark eye region with a candidate replacement region of the low frequency image. For example, as illustrated in FIG. 3, the corrected color image comprises a blurred image with a corrected (i.e., replaced) dark eye region. FIG. 8 and the corresponding paragraphs provide additional detail regarding how the eye region correction system 106 generates a corrected color image in accordance with one or more embodiments.

The eye region correction system 106 further performs the act 310 of generating a corrected digital image. After the eye region correction system 106 corrects eye wrinkle contours in the high frequency image 312 and dark eye regions in the low frequency image 314, the eye region correction system 106 performs the act 310 by combining the corrected texture image with the corrected color image. For instance, and as illustrated in FIG. 3, the eye region correction system 106 generates a corrected digital image that is free of the dark eye region and wrinkle edges present in the digital image 316.

Although FIG. 3 illustrates the eye region correction system 106 correcting both eye wrinkle contours and dark eye regions within the digital image 316, the eye region correction system 106 may also correct a single type of eye region artifact within the digital image 316. In particular, the eye region correction system 106 can correct dark eye regions or eye wrinkle contours. For example, if the eye region correction system 106 determines to correct either dark eye regions or eye wrinkle contours, the eye region correction system 106 performs the act 304 of generating a high frequency image and a low frequency image. To correct only dark eye regions, the eye region correction system 106 performs the act 308 of generating a corrected color image and generates a corrected digital image by combining the corrected color image with the high frequency image 312. Similarly, to correct only eye wrinkle contours, the eye region correction system 106 performs the act 306 of generating a corrected texture image and generates the corrected digital image by combining the corrected texture image with the low frequency image 314. Moreover, in some embodiments, the eye region correction system 106 can generate a corrected image without generating a high frequency/low frequency image (e.g., by performing acts directly on pixels of the original image).

Figure 4:
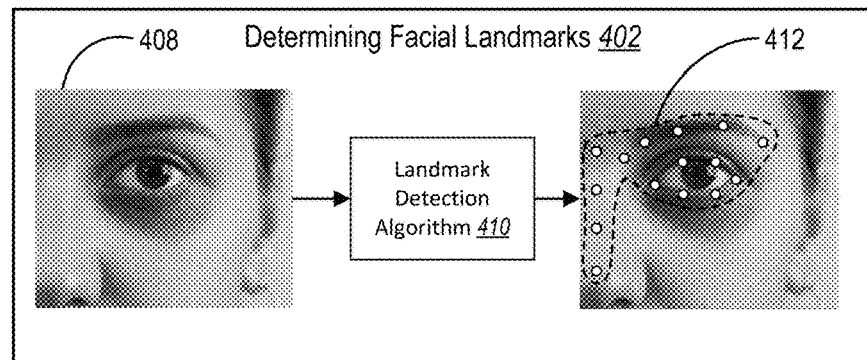
FIG. 4 illustrates a diagram of determining a sub-eye region and a sampling area based on facial landmarks in accordance with one or more embodiments of the present disclosure.
Figure 4:
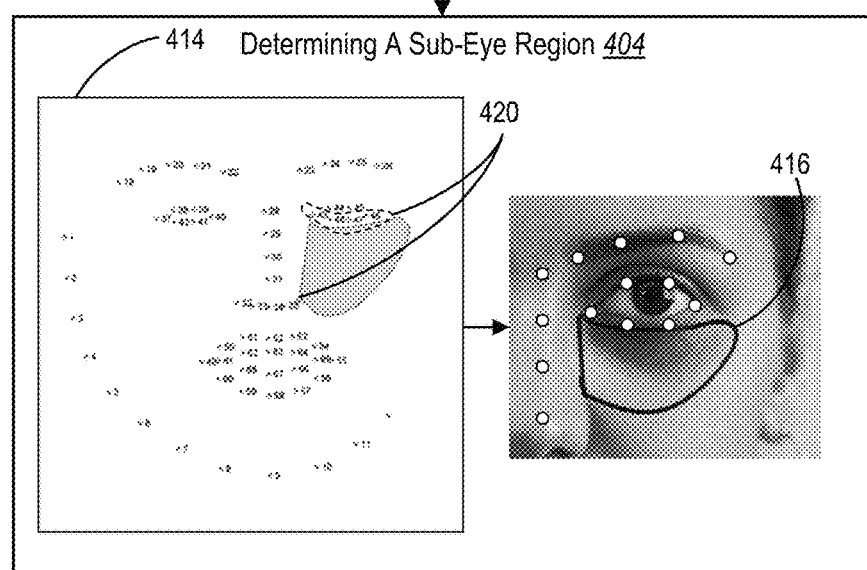
Figure 4:
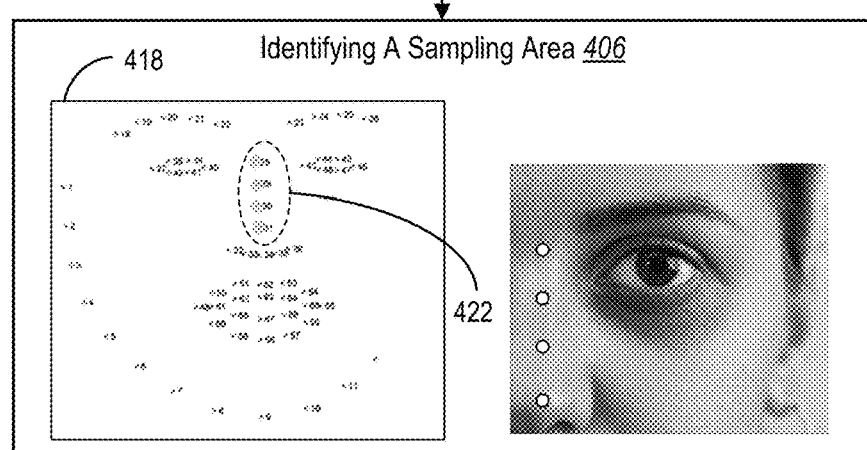

FIG. 3 provides a general overview illustrating the eye region correction system 106 generating a corrected digital image in accordance with one or more embodiments. The following figures provide additional detail for acts generally described in FIG. 3. As mentioned, the eye region correction system 106 utilizes a facial landmark detection algorithm to identify both a sub-eye region and a sampling area. For example, FIG. 4 provides an overview of the eye region correction system 106 utilizing a facial landmark detection algorithm to determine a sub-eye region and a sampling area. In particular, FIG. 4 illustrates a series of acts 400 including an act 402 of determining facial landmarks, an act 404 of determining a sub-eye region, and an act 406 of identifying a sampling area.

As illustrated in FIG. 4, the eye region correction system 106 performs the act 402 of determining facial landmarks. In particular, as part of the act 402, the eye region correction system 106 utilizes a landmark detection algorithm 410 to generate facial landmarks 412. Generally, the landmark detection algorithm 410 automatically identifies locations of key facial landmarks on facial images or videos. The eye region correction system 106 may utilize a variety of landmark detection algorithms to generate the facial landmarks 412. In one example, the landmark detection algorithm 410 comprises a True Vision Solution (TVS) landmark tracker. More specifically, the TVS landmark tracker is an implementation of deformable model fitting that makes independent predictions regarding locations of landmarks. More specifically, the TVS landmark tracker employs an optimization strategy where nonparametric representations of likelihoods are maximized within a hierarchy of smoothed estimates.

Additionally, or alternatively, the landmark detection algorithm 410 comprises various other types of algorithms. For example, in one or more embodiments, the landmark detection algorithm 410 comprises a facial landmark detection algorithm. Example facial landmark detection algorithms include holistic methods (e.g., an Active Appearance Model, fitting algorithms), Constrained Local Model (CLM) methods (e.g., problem formulation models, local appearance models, face shape models), and regression-based methods (e.g., direct regression methods, cascaded regression methods, deep learning based methods). Additionally, or alternatively, the eye region correction system 106 utilizes a landmark detection algorithm that is face landmark agnostic.

The facial landmarks 412 are associated with key facial landmarks. In particular, the facial landmarks 412 indicate estimations of locations of facial features such as points along a face's eyebrows, eyes, nose, lips, and various contour points of parts of a face. For instance, and as illustrated in FIG. 4, the eye region correction system 106 generates the facial landmarks 412 that indicates locations along the eyebrow, eye, and nose of the digital image 408.

As further illustrated in FIG. 4, the eye region correction system 106 performs the act 404 of determining a sub-eye region. For example, and as illustrated in FIG. 4, the eye region correction system 106 determines a sub-eye region 416. In particular, the sub-eye region 416 comprises an area below an eye that can contain eye region artifacts.

In one or more embodiments, and as illustrated in FIG. 4, the eye region correction system 106 determines the sub-eye region 416 based on predefined sub-eye landmark points. In particular, the eye region correction system 106 designates particular facial landmarks as sub-eye landmark points. For instance, and as illustrated in facial landmark map 414 in FIG. 4, the eye region correction system 106 designates facial landmarks 420 as sub-eye landmark points. More specifically, the eye region correction system 106 determines that the sub-eye region comprises a closed polygon consisting of the sub-eye landmark points. Accordingly, the eye region correction system 106 determines the sub-eye region 416 based on the sub-eye landmark points illustrated in the facial landmark map 414. In one or more embodiments, the eye region correction system 106 determines the sub-eye landmark points based on user input. Additionally, or alternatively, the eye region correction system 106 predefines the sub-eye landmark points based on historical eye region artifact data. For example, in one or more embodiments, the eye region correction system 106 determines the sub-eye landmark points by identifying an area with a greater occurrence of eye region artifacts.

As further illustrated in FIG. 4, the eye region correction system 106 performs the act 406 of identifying a sampling area. Generally, the sampling area comprises a region of pixels with a target color for the sub-eye region. In particular, the sampling area comprises sample colors that reflect a preferred color of the sub-eye region (that is free of a dark eye region). In one or more embodiments, the eye region correction system 106 determines the sampling area based on predetermined facial landmarks. In particular, the eye region correction system 106 designates particular facial landmarks as sampling landmark points. For instance, and as illustrated in facial landmark map 418, the eye region correction system 106 designates pixels at facial landmarks 422 as sampling landmark points (e.g., nose landmarks). As illustrated, the sampling area in FIG. 4 comprises circles with a 15-pixel radius at the locations of the facial landmarks 422. Additionally, or alternatively, the eye region correction system 106 designates facial landmark points at one or more other locations as the sampling landmark points (e.g., cheek landmarks or chin landmarks).

In some embodiments, the eye region correction system 106 combines sample colors from one or more of the sampling landmark points. For example, the eye region correction system 106 can determine an average, median, weighted average, or other combination of sample colors from one or more of the landmark points to determine the color of the sampling area.

As mentioned, as part of generating corrected digital images, the eye region correction system 106 generate a corrected color image. More specifically, the eye region correction system 106 corrects dark eye regions of digital images. FIG. 5 and the corresponding discussion describe the eye region correction system 106 generating a corrected digital image by replacing a dark eye region with a candidate eye region in accordance with one or more embodiments. In particular, FIG. 5 illustrates a series of acts 500 including an act 502 of determining a sub-eye region, an act 504 of determining a dark eye region within the sub-eye region, an act 506 of identifying a candidate replacement region, and an act 508 of generating a corrected digital image by replacing the dark-eye region with the candidate eye region.

As part of the series of acts 500 illustrated in FIG. 5, the eye region correction system 106 performs the act 502 of determining a sub-eye region and a sampling area. In particular, the eye region correction system 106 determines the sub-eye region of the digital image and a sampling area of the digital image from facial landmarks generated utilizing a facial landmark detection algorithm. For instance, the eye region correction system 106 utilizes the methods and acts described above with respect to FIG. 4 to determine a sampling area 510 and a sub-eye region 512.

Figure 6:
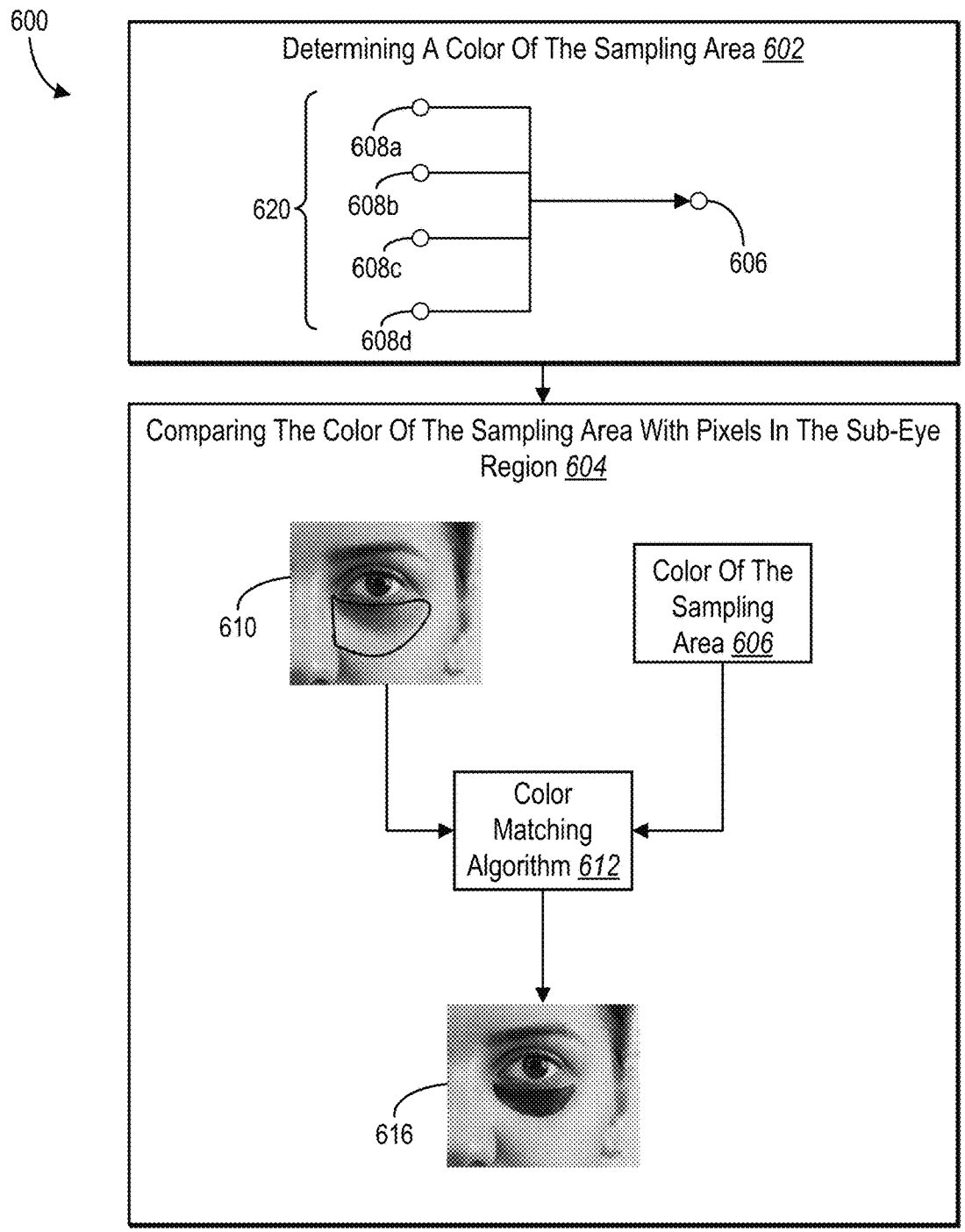
FIG. 6 illustrates a diagram of identifying a dark eye region in accordance with one or more embodiments of the present disclosure.

As further illustrated in FIG. 5, the eye region correction system 106 performs the act 504 of determining a dark eye region within the sub-eye region. In particular, the eye region correction system 106 compares a color of the sampling area 510 with pixels within the sub-eye region 512 to identify a dark eye region 514. More specifically, the dark eye region 514 comprises pixels that are a threshold difference from the sample color of the sampling area 510. FIG. 6 and the corresponding discussion provide additional detail of the eye region correction system 106 determining a dark eye region within the sub-eye region in accordance with one or more embodiments.

As illustrated in FIG. 5, the eye region correction system 106 further performs the act 506 of identifying a candidate replacement region. Generally, the candidate replacement region comprises pixels that more closely match the color of the sampling area. In particular, the eye region correction system 106 identifies a candidate replacement region from the digital image by sampling the digital image utilizing the dark eye region and the color of the sampling area. More specifically, the eye region correction system 106 samples potential candidate replacement regions at different locations within the digital image. In one or more embodiments, candidate replacement regions comprise a size and shape of the dark eye region 514. For instance, the eye region correction system 106 identifies candidate replacement regions 516a-516c that are the same shape and size as the dark eye region 514. Additionally, the eye region correction system 106 samples candidate replacement regions 516a-516c that are each at different locations and varying distances from the dark eye region 514.

Figure 7:
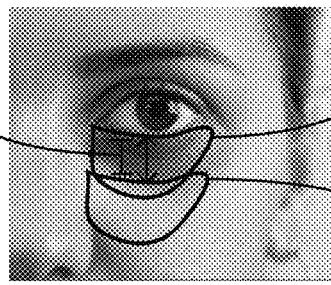
FIG. 7 illustrates a diagram of determining a candidate replacement region in accordance with one or more embodiments of the present disclosure.
Figure 7:
Figure 7:
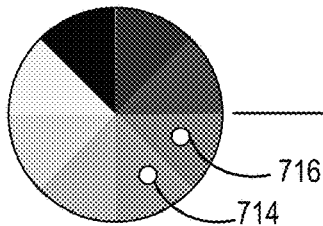
Figure 7:
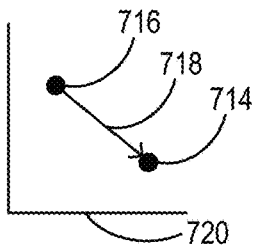

The eye region correction system 106 selects a candidate replacement region by determining that a difference between the color of the candidate replacement region and the color of the sampling area satisfies a threshold candidate color value. In one example, the eye region correction system 106 determines that the difference between the color of the candidate replacement region 516a and a color of a sampling area exceeds a threshold candidate color value. The eye region correction system 106 then iteratively samples additional candidate replacement regions (e.g., the candidate replacement regions 516b-516c) until the eye region correction system 106 determines a candidate replacement region that satisfies the threshold candidate color value. FIG. 7 and the corresponding discussion provide additional detail regarding the eye region correction system 106 sampling candidate replacement regions in accordance with one or more embodiments.

As further illustrated in FIG. 5, the eye region correction system 106 performs the act 508 of generating a corrected digital image by replacing the dark eye region with the candidate eye region. In some embodiments, and as described previously, the eye region correction system 106 performs the act 508 by generating a corrected color image by creating a low frequency image and replacing the dark eye region 514 with the candidate replacement region in the low frequency image. To generate a corrected digital image 518, the eye region correction system 106 combines the low frequency corrected color image with a high frequency image.

More specifically, in one or more embodiments, the replaces the dark eye region with the candidate eye region by utilizing a patch-based optimization algorithm. Generally, the eye region correction system 106 may utilize the patch-based optimization algorithm to replace pixels within the dark eye region 514 with pixels from a candidate replacement region (e.g., the candidate replacement regions 516a-516c). In some embodiments, the eye region correction system 106 does not directly deposit pixels from the candidate replacement region to replace the dark eye region 514. Rather, the eye region correction system 106 utilizes the patch-based optimization algorithm to match texture, lighting, shading, and other features of the dark eye region 514. An example patch-based optimization algorithm is described in US Pub. No. US 2017/0116769 A1, entitled "Content Aware Image Editing," published Apr. 27, 2017, the disclosure of which is incorporated by reference herein.

In some embodiments, the eye region correction system 106 utilizes various parameters as part of performing the act 508 of generating the corrected digital image by replacing the dark eye region with the candidate eye region. In particular, by utilizing parameters 520, the eye region correction system 106 provides added customization options for generating the corrected digital image 518. In one or more embodiments, the eye region correction system 106 automatically determines values for the parameters 520 to generate the corrected digital image 518 and provides, via a user client device, options to manually adjust values for the parameters 520. As illustrated in FIG. 5, the parameters 520 include diffusion, fidelity, and color adaptation.

As illustrated in FIG. 5, the parameters 520 include a diffusion value. The diffusion parameter controls how quickly the candidate replacement region adapts to the surrounding image. For example, the eye region correction system 106 associates a lower diffusion value with a rapid transition to the surrounding pixels and a higher diffusion value with a more gradual transition to surrounding pixels. More specifically, a low diffusion value (e.g., 1) is associated with a hard candidate replacement region edge and a high diffusion value (e.g., 7), is associated with a soft candidate replacement region edge.

The parameters 520 illustrated in FIG. 5 also includes a fidelity value. In one or more embodiments, the fidelity value comprises an edge fidelity feature. In particular, the eye region correction system 106 controls the smoothness of edges around the candidate replacement region based on an edge fidelity value. For example, in at least one embodiment, the eye region correction system 106 associates a greater edge fidelity value with smoother or rounder edges while lower edge fidelity values and lower edge fidelity values with sharp or rough edges.

As further illustrated in FIG. 5, the parameters 520 include a color adaptation value. The color adaptation feature controls the color, brightness, and contrast of the filled area to generate a seamless transition between the original image and the candidate replacement region. For example, based on a high color adaptation value, the eye region correction system 106 creates a more subtle transition between the candidate replacement region and the surrounding pixels. Based on a low color adaptation value, the eye region correction system 106 generates a harsher transition between the edge of the candidate replacement region and the surrounding pixels.

Furthermore, the eye region correction system 106 performs additional acts to seamlessly blend the candidate replacement region with surrounding pixels in the corrected digital image 518. In particular, the eye region correction system 106 generates a path around the candidate replacement region and upon replacing the dark eye region with the candidate replacement region, the eye region correction system 106 processes the path around the candidate replacement region utilizing a smoothing algorithm. In one or more embodiments, the eye region correction system 106 predetermines the width of the path around the candidate replacement region. In one example, the eye region correction system 106 generates a path with a 10-pixel width that bounds the edge of the candidate replacement region. The eye region correction system 106 then utilizes the smoothing algorithm to create a seamless transition from the candidate replacement region to the surrounding pixels within the path.

To illustrate, in one or more embodiments, the eye region correction system 106 smooths the path around the candidate replacement region by utilizing tools available in digital image editing systems. For example, in one or more embodiments, the eye region correction system 106 utilizes a spot healing brush tool as the smoothing algorithm to create a seamless transition between the candidate replacement region and the surrounding pixels. More specifically, the spot healing brush tool detects spot pixels within the path that differ from the majority of the pixel values in the digital image or in surrounding pixels. The eye region correction system 106 replaces the different pixels with pixels from elsewhere in the digital image. An example spot healing brush tool is described in U.S. Pat. No. 9,613,288 B2, entitled "Automatically Identifying and healing Spots in Images," filed Nov. 14, 2014, the disclosure of which is incorporated herein by reference.

FIG. 5 and the corresponding discussion provide an overview of the eye region correction system 106 replacing a dark eye region with a candidate eye region in one or more embodiments. FIGS. 6-8 further detail acts generally described in FIG. 5. In particular, FIG. 6 and the accompanying paragraphs provide additional detail regarding the eye region correction system 106 determining the dark eye region in accordance with one or more embodiments. FIG. 6 illustrates a series of acts 600 including an act 602 of determining a color of the sampling area and an act 604 of comparing the color of the sampling area with pixels in the sub-eye region.

As illustrated in FIG. 6, the eye region correction system 106 performs the act 602 of determining a color of the sampling area. As part of determining a color of the sampling area 606, the eye region correction system 106 determines a set of sample colors from sampling landmark points 608a-608d. As mentioned, in one or more embodiments, the eye region correction system 106 determines a sampling area 620 comprising one or more sampling landmark points. For instance, and as illustrated, the eye region correction system 106 determines that the sampling area 620 comprises sampling landmark points 608a-608d. The eye region correction system 106 determines a set of sample colors from the sampling landmark points 608a-608d. In one example, the eye region correction system 106 extracts a sample color from each of the sampling landmark points 608a-608d. More specifically, in at least one embodiment, the eye region correction system 106 combines the sample colors (e.g., determines an average pixel value corresponding to each of the sampling landmark points 608a-608d). In some embodiments, the eye region correction system 106 combines the sample colors to determine the color of the sampling area by utilizing other methods. In one example, the eye region correction system 106 determines a median pixel value of the sampling landmark points 608a-608d. In another example, the eye region correction system 106 identifies a subset of sampling landmark points based on the sampling landmark points 608a-608d with the most similar pixel values. The eye region correction system 106 then determines an average pixel value for the subset of sampling landmark points.

Additionally, as part of performing the act 602 of determining a color of the sampling area, the eye region correction system 106 combines the set of sample colors. In one or more embodiments, the eye region correction system 106 combines the set of sample colors by averaging the set of colors from the sampling landmark points 608a-608d. For instance, and as illustrated in FIG. 6, the eye region correction system 106 averages colors from the sampling landmark points 608a-608d to generate the color of the sampling area 606. In one example, the eye region correction system 106 averages pixel values across the sampling landmark points 608a-608d. The eye region correction system 106 averages the colors to avoid biasing the color of the sampling area 606. For instance, if any one of the sampling landmark points 608a-608d includes a mole or discolored skin, the eye region correction system 106 avoids generating a biased color of the sampling area 606.

As further illustrated in FIG. 6, the eye region correction system 106 performs the act 604 of comparing the color of the sampling area with pixels in the sub-eye region. Generally, the eye region correction system 106 determines a dark eye region 616 by determining that a difference between the color of the sampling area 606 and pixels in a sub-eye region 610 satisfies a color difference threshold. In one example, the eye region correction system 106 determines a color difference threshold. The eye region correction system 106 determines a difference between each pixel within the sub-eye region 610 and the color of the sampling area 606.

In one or more embodiments, the eye region correction system 106 performs the act 604 of comparing the color of the sampling area with pixels in the sub-eye region by utilizing a color matching algorithm 612. In particular, the color matching algorithm 612 quantifies colors of pixels within the sub-eye region 610 and the color of the sampling area 606 to generate metric differences. Furthermore, the eye region correction system 106 configures the color difference threshold utilized by the color matching algorithm 612. Generally, the eye region correction system 106 utilizes the color matching algorithm 612 to map colors within a color space and determine a distance between the colors within the color space. In one example, the eye region correction system 106 utilizes the color matching algorithm 612 to map the color of a pixel within the sub-eye region 610 and the color of the sampling area 606 within a Red, Green, Blue (RGB) color space. The eye region correction system 106 then calculates a Euclidean distance to determine the difference between the color of the pixel of the sub-eye region 610 and the color of the sampling area 606. In one or more other embodiments, the eye region correction system 106 utilizes the color matching algorithm 612 to map the colors into a uniform color space such as a CIELAB or CIELUV space. In any case, the eye region correction system 106 determines whether differences between a color of the sampling area 606 and a pixel in the sub-eye region 610 satisfies (e.g., is greater than) a color difference threshold.

For example, as illustrated in FIG. 6, the eye region correction system 106 determines the dark eye region 616 within the digital image. In particular, the eye region correction system 106 localizes pixels within the sub-eye region 610 that satisfy the color difference threshold when compared with the color of the sampling area 606. In one or more embodiments, the eye region correction system 106 generates a polygon surrounding pixels within the sub-eye region whose differences with the color of the sampling area 606 satisfies the color difference threshold and designates pixels within the polygon as the dark eye region 616.

FIG. 6 illustrates detail regarding the eye region correction system 106 determining a dark eye region in accordance with one or more embodiments. FIG. 7 provides additional detail regarding how the eye region correction system 106 determines a candidate replacement region in accordance with one or more embodiments. In particular, FIG. 7 illustrates a series of acts 700 includes an act 702 of sliding down the dark eye region by a set number of pixels, an act 704 of calculating an average color of pixels for the first potential candidate replacement region, an act 706 of determining if a difference between the color of the potential candidate replacement region satisfies a color threshold. As further illustrated in FIG. 7, the eye region correction system 106 performs the act 702, the act 704, and the act 706 iteratively until the eye region correction system 106 determines a candidate replacement region.

As illustrated in FIG. 7, the eye region correction system 106 performs the act 702 of sliding down the dark eye region by a set number of pixels. As mentioned previously, the eye region correction system 106 identifies a potential candidate replacement region 708 at a location that is a distance 712 from a dark eye region 710. In one example, the eye region correction system 106 determines the potential candidate replacement region 708 by sliding down a region the same size and shape as the dark eye region 710, by a predefined number of pixels (e.g., 5 pixels) to a location directly below the dark eye region 710. In one or more embodiments, the eye region correction system 106 identifies potential candidate replacement regions in other directions relative to the dark eye region 710. In one example, the eye region correction system 106 identifies a potential candidate replacement region that is five pixels down and two pixels to the right relative to the dark eye region 710.

As further illustrated in FIG. 7, the eye region correction system 106 performs the act 704 of determining a color for the potential candidate replacement region. Generally, the eye region correction system 106 determines whether a potential candidate replacement region is suitable to replace the dark eye region 710. In particular, the eye region correction system 106 determines whether pixels in the potential candidate replacement region 708 are a correct skin tone of the face within the digital image. For instance, and as illustrated in FIG. 7, the eye region correction system 106 calculates an average color of pixels for the potential candidate replacement region 708. In one or more embodiments, the eye region correction system 106 determines the pixel value of each pixel within the potential candidate replacement region 708 and averages the pixel values. In another example, the eye region correction system 106 determines a median color of pixels for the potential candidate replacement region 708. In one or more embodiments, the eye region correction system 106 determines a subset of pixels within the potential candidate replacement region 708—for instance, by determining a subset of pixels with the most similar pixel values. The eye region correction system 106 determines an average pixel value of the subset of pixels within the potential candidate replacement region 708. As illustrated, the eye region correction system 106 determines that the average RGB pixel value of the potential candidate replacement region 708 equals [237, 200, 121].

The series of acts 700 also includes the act 706 of determining if a difference between the color of the potential candidate replacement region and the color of the sampling area satisfies a color threshold. In one or more embodiments, the eye region correction system 106 utilizes the same color of the sampling area utilized to determine the dark eye region. In particular, the eye region correction system 106 compares the color of the sampling area with the color of the potential candidate replacement region. In one or more embodiments, the eye region correction system 106 utilizes a color matching algorithm (e.g., the color matching algorithm 612) to determine whether the difference satisfies (e.g., is less than) the threshold candidate color value. In one example, and as illustrated in FIG. 7, the eye region correction system 106 maps a color of the potential candidate replacement region 716 and a color of the sampling area 714 within a color space 720. The eye region correction system 106 measures a distance 718 between the color of the sampling area 714 and the color of the potential candidate replacement region 716. In one or more embodiments, the eye region correction system 106 maps the colors in an RGB color space or a uniform color space.

Additionally, in some embodiments, the eye region correction system 106 determines whether the potential candidate replacement region 708 contains artifacts. Generally, the eye region correction system 106 does not replace a dark eye region with a potential candidate replacement region if the potential candidate replacement region includes artifacts such as moles, scars, tags, etc. In one example, the eye region correction system 106 determines whether the potential candidate replacement region 708 includes artifacts by determining whether pixels within the potential candidate replacement region 708 fall within a predetermined threshold range of pixel values. In particular, the eye region correction system 106 determines the threshold range of pixel values based on the color of the sampling area. For instance, the threshold range of pixel values can comprise an upper limit and a lower limit that are equidistant from the color of the sampling area. The eye region correction system 106 compares values of individual pixels with the threshold range of pixel values. The eye region correction system 106 determines to reject a candidate replacement region based on a threshold number of pixels falling outside the threshold range of pixel values. In one example, rather than rejecting the candidate replacement region, the eye region correction system 106 identifies pixels within the potential candidate replacement region that fall outside the threshold range of pixel values and automatically replaces those pixels with surrounding pixels. The eye region correction system 106 then utilizes the modified candidate replacement region.

Based on determining that the difference between the average color of the potential candidate replacement region and the color of the sampling area satisfies the threshold candidate color value and that the pixels within the potential candidate replacement region fall within a predetermined threshold range of pixel values, the eye region correction system 106 designates the potential candidate replacement region 708 as the candidate replacement region. However, if the eye region correction system 106 determines that the difference between the average color of the potential candidate replacement region 716 and the color of the sampling area 714 does not satisfy or is greater than the threshold candidate color value or that the potential candidate replacement region contains artifacts, the eye region correction system 106 repeats the series of acts 700 but with a different potential candidate replacement region.

To illustrate, in one or more embodiments, the eye region correction system 106 determines a second potential candidate replacement region that is at a second location that is a set number of pixels from the first potential candidate replacement region. For example, the eye region correction system 106 slides down the first potential candidate replacement region by a set number of pixels (e.g., 5 pixels) to determine the second potential candidate replacement region. The eye region correction system 106 repeats the series of acts 700 until the eye region correction system 106 determines a candidate replacement region.

Figure 9:
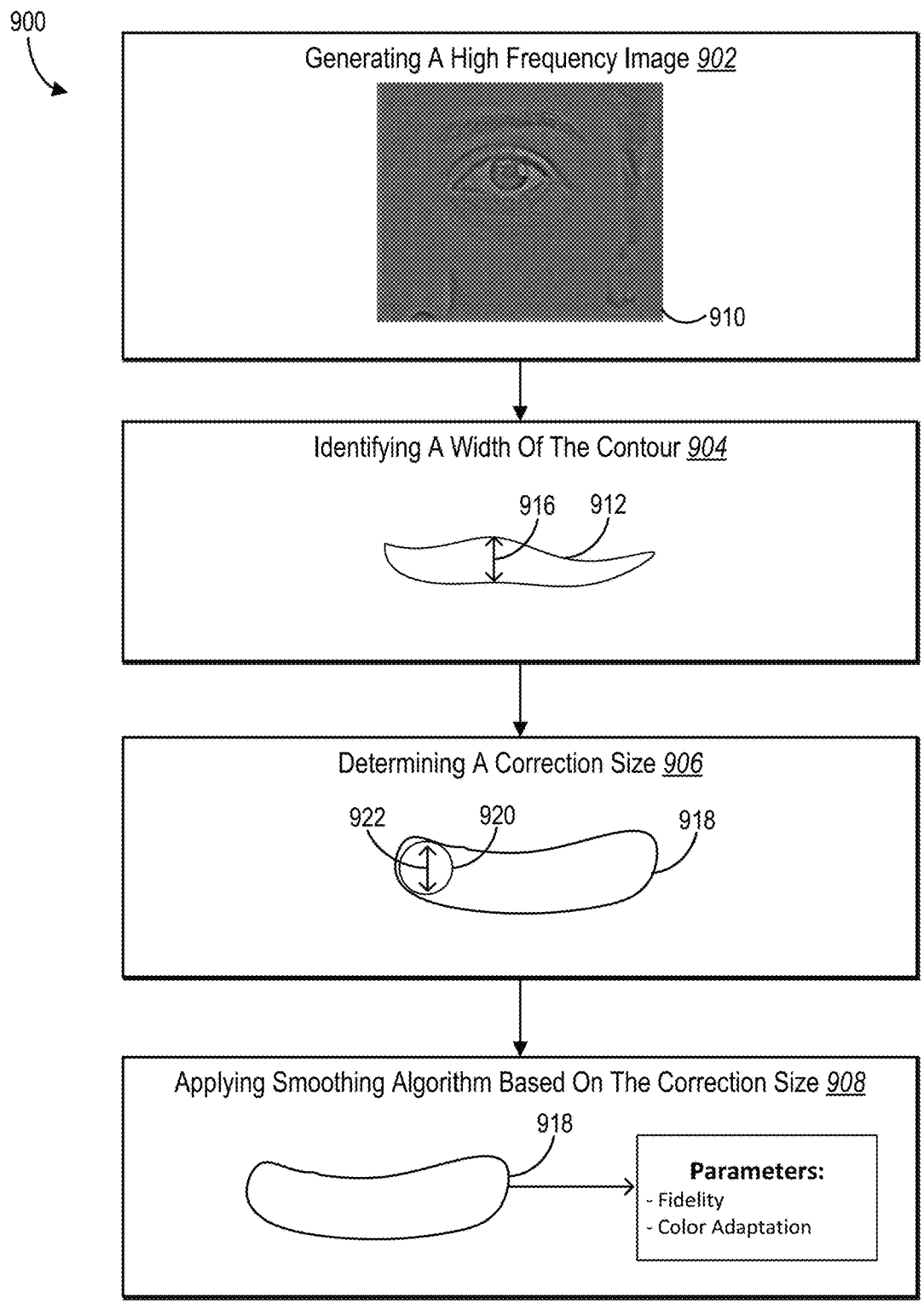
FIG. 9 illustrates a diagram of correcting wrinkle contours by applying a smoothing algorithm in accordance with one or more embodiments of the present disclosure.

As mentioned previously, the eye region correction system 106 also automatically detects and corrects wrinkle edges in digital images. FIG. 8 and FIG. 9 provide additional detail for the eye region correction system 106 correcting textural eye region artifacts in accordance with one or more embodiments. More specifically, FIG. 8 illustrates the eye region correction system 106 defining wrinkle contours in accordance with one or more embodiments. FIG. 9 illustrates the eye region correction system 106 correcting a wrinkle edge by processing the eye wrinkle contour utilizing a smoothing algorithm in accordance with one or more embodiments.

As mentioned, FIG. 8 and the corresponding discussion provide additional detail regarding the eye region correction system 106 generating an eye wrinkle contour in accordance with one or more embodiments. In particular, FIG. 8 illustrates a series of acts 800 including an act 802 of determining a sub-eye region, an act 804 of converting the image to grayscale, an act 806 of identifying wrinkle edges, and an act 808 of defining wrinkle contours.

As illustrated in FIG. 8, the series of acts 800 includes the act 802 of determining a sub-eye region. Generally, the eye region correction system 106 determines a sub-eye region 810 in which wrinkle edges of eye bags and under-eye wrinkles can be found. In some embodiments, the sub-eye region 810 comprises the same sub-eye region utilized in identifying dark eye regions. More specifically, the eye region correction system 106 determines the sub-eye region 810 based on sub-eye landmark points described above in relation to FIG. 4. In other embodiments, the eye region correction system 106 determines the sub-eye region 810 specific to identifying wrinkle edges.

In one or more embodiments, the eye region correction system 106 performs the act 804 of converting the image to grayscale. In particular, the eye region correction system 106 converts the digital image into a grayscale image 812. The eye region correction system 106 converts the digital image into the grayscale image 812 to facilitate edge detection in the following act.

As further illustrated in FIG. 8, the eye region correction system 106 performs the act 806 of identifying wrinkle edges. In particular, the eye region correction system 106 identifies wrinkle edges within the sub-eye region 810 by utilizing an edge detection algorithm 814. The edge detection algorithm 814 finds boundaries of objects within images. More specifically, the edge detection algorithm 814 detects discontinuities in brightness in the grayscale image 812. In one example, the edge detection algorithm 814 comprises a Canny edge detection algorithm. The edge detection algorithm 814 determines wrinkle edges 816 within the sub-eye region 810. For instance, in some embodiments, the edge detection algorithm 814 presents the wrinkle edges 816 in a binary image as illustrated in FIG. 8. In one or more other embodiments, the eye region correction system 106 utilizes other types of edge detection algorithms. For instance, in some embodiments, the eye region correction system 106 utilizes various other edge detection algorithms including Sobel, Prewitt, Roberts, fuzzy logic methods, and other edge detection algorithms.

The eye region correction system 106 further performs the act 808 of defining wrinkle contours. In particular, the eye region correction system 106 finds closed contours or regions of wrinkles within the sub-eye region 810. In one example, the eye region correction system 106 generates wrinkle contours 818 for wrinkle edges by utilizing morphological operations 820. More specifically, the eye region correction system 106 performs the morphological operations 820 including dilation, erosion, opening, and closing to define the wrinkle contours 818.

Generally, the eye region correction system 106 utilizes the morphological operations 820 to filter out noise and less-prominent wrinkles before processing the digital image. In particular, the eye region correction system 106 utilizes dilation to join disconnected pixels. For instance, the eye region correction system 106 joins disconnected pixels that are part of an identified wrinkle edge. The eye region correction system 106 the utilizes erosion to reduce boundaries of wrinkle edges. The eye region correction system 106 also utilizes opening operations to smooth contours and closing operations to fuse narrow breaks while also filling gaps in contours.

FIG. 8 illustrates the eye region correction system 106 generating wrinkle contours corresponding to wrinkle edges in accordance with one or more embodiments. FIG. 9 illustrates how the eye region correction system 106 processes a wrinkle contour in accordance with one or more embodiments. In particular, FIG. 9 illustrates a series of acts 900 comprising an act 902 of generating a high frequency image, an act 904 of identifying a width of the contour, an act 906 of determining a correction size, and an act 908 of applying a smoothing algorithm based on the correction size.

As illustrated in FIG. 9, the eye region correction system 106 performs the act 902 of generating a high frequency image. In particular, the eye region correction system 106 generates a high frequency image 910 from the digital image. The high frequency image 910 reflects a texture layer of the digital image. In one example, the eye region correction system 106 generates the high frequency image 910 by subtracting a low frequency image (or a color layer) from the digital image.

The eye region correction system 106 further performs the act 904 of identifying a width of the contour. In particular, the eye region correction system 106 determines a max width 916 of an eye wrinkle contour 912. The eye region correction system 106 identifies a max width for each wrinkle contour within the sub-eye region. The eye region correction system 106 utilizes the max width 916 to determine a precise correction size for each wrinkle contour.

The eye region correction system 106 further performs the act 906 of determining a correction size. In particular, the eye region correction system 106 determines a correction size 922 corresponding to the eye wrinkle contour 912. In one embodiment, the eye region correction system 106 determines the correction size 922 based on the max width 916 of the eye wrinkle contour 912. For example, in one or more embodiments, the correction size 922 equals the max width 916 of the eye wrinkle contour 912. In another example, the correction size 922 is greater than the max width 916 by a predetermined size (e.g., 5 pixels, 10 pixels, etc.) or smaller than the max width 916 by a predetermined size.

As further illustrated in FIG. 9, the eye region correction system 106 performs the act 908 of applying a smoothing algorithm based on the correction size. In particular, the eye region correction system 106 utilizes a smoothing algorithm to smooth pixels within a correction area 918. The eye region correction system 106 determines the correction area 918 by utilizing a correction tool 920 of the correction size 922. In one example, the eye region correction system 106 traces the edges of the eye wrinkle contour 912 using the correction tool 920 to generate the correction area 918. In another example, the eye region correction system 106 determines a centroid of the eye wrinkle contour 912 and traces the centroid with the correction tool 920.

In one or more embodiments, the eye region correction system 106 replaces pixels within the correction area 918 with pixels from different locations within the digital image. For instance, the eye region correction system replaces pixels of the correction area 918 with sample pixels from a sample area in the digital image. In one or more embodiments, the eye region correction system 106 utilizes a spot healing brush tool with a diameter equal to the correction size (and then applies the spot healing brush tool to the contour as described above). An example spot healing brush tool is described above in the discussion accompanying FIG. 5.

Furthermore, and as illustrated in FIG. 9, the eye region correction system 106 utilizes parameters when applying the smoothing algorithm as part of the act 908. For example, the eye region correction system 106 utilizes a fidelity parameter and a color adaptation parameter to modify corrections performed using the smoothing algorithm. As mentioned, the fidelity parameter controls the smoothness of edges surrounding the correction area 918. Furthermore, the eye region correction system 106 applies varying color adaptations when applying the smoothing algorithm. As mentioned previously, the color adaptation feature controls the color, brightness, and contrast of the smoothed area (i.e., the correction area 918) to generate a seamless transition between the smoothed area and the surrounding pixels.

As mentioned, the eye region correction system 106 also generates corrected digital images based on classifications for faces of digital images. In one example, the eye region correction system 106 determines an age and/or gender classification for the face. FIG. 10 illustrates a series of acts 1000 by which the eye region correction system 106 generates a corrected digital image based on a classification for a face in accordance with one or more embodiments. In particular, FIG. 10 illustrates a series of acts 1000 comprising an act 1002 of determining a classification for the face, an act 1004 of determining parameters based on the classification, and an act 1006 of modifying the corrected digital image.

As illustrated in FIG. 10, the eye region correction system 106 performs the act 1002 of determining a classification for the face. In particular, the eye region correction system 106 analyzes a face of a digital image 1010 to generate a classification 1012. For instance, and as illustrated, the eye region correction system 106 generates the classification 1012 comprising a gender classification and an age classification. In some embodiments, the eye region correction system 106 utilizes a classification algorithm to determine the classification 1012. In one example, the eye region correction system 106 utilizes a deep learning algorithm to generate the classification 1012 for the face.

To illustrate, in one or more embodiments, the eye region correction system 106 trains a convolutional neural network for age and/or gender classification. For example, the eye region correction system 106 trains the neural network using training images with known ages and genders. The eye region correction system 106 then applies the trained neural network to the digital image 1010 to generate the classification 1012.

As further illustrated in FIG. 10, the eye region correction system 106 performs the act 1004 of determining parameters based on the classification. Generally, the eye region correction system 106 maps age and gender to specific combinations of parameters. By mapping particular classifications with sets of parameter values, the eye region correction system 106 generates more accurate and realistic results. For instance, men and women within the age range 65-74 typically have more wrinkles than men and women in younger age groups (e.g., 25-45). Thus, to generate more realistic corrected images, the eye region correction system 106 determines to smoothen rather than completely remove wrinkles for men and women within 65-74 age range.

More specifically, the eye region correction system 106 maps particular age and gender classifications to specific parameter values for fidelity and color adaptation. For instance, and as illustrated in FIG. 10, the eye region correction system 106 determines that a fidelity value of 3 and "Low" color adaptation correspond to the classification 1012. When the eye region correction system 106 applies these parameters to the wrinkle contours, the eye region correction system 106 generates a corrected image with smoother wrinkle edges and more abrupt color transitions between the wrinkle contours and the surrounding pixels. The eye region correction system 106 may also apply the parameters to corrections for dark eye regions. While FIG. 10 illustrates a single set of parameters for the classification 1012, the eye region correction system 106 may also associate different parameters for the classification 1012 corresponding to dark eye region corrections and wrinkle contour corrections. For instance, while the eye region correction system 106 utilizes the parameters illustrated in FIG. 10 in correcting wrinkle edges, the eye region correction system 106 may utilize a different mapped set of parameters in correcting dark eye regions.

As further illustrated in FIG. 10, the eye region correction system 106 performs the act 1006 of modifying the corrected digital image. In particular, the eye region correction system 106 modifies the parameters for generating the corrected texture image and parameters for generating the corrected color image. For instance, and as illustrated in FIG. 10, the eye region correction system 106 modifies the parameters in generating a corrected digital image 1014. More specifically, the corrected digital image 1014 still includes a dark eye region and wrinkles, though they are more subtle than the dark eye regions and the wrinkle edges in the digital image 1010. More specifically, the eye region correction system 106 adjusts the parameters utilized in applying the smoothing algorithm to the edges of the dark eye regions and to the wrinkle contours.

Figure 11A:
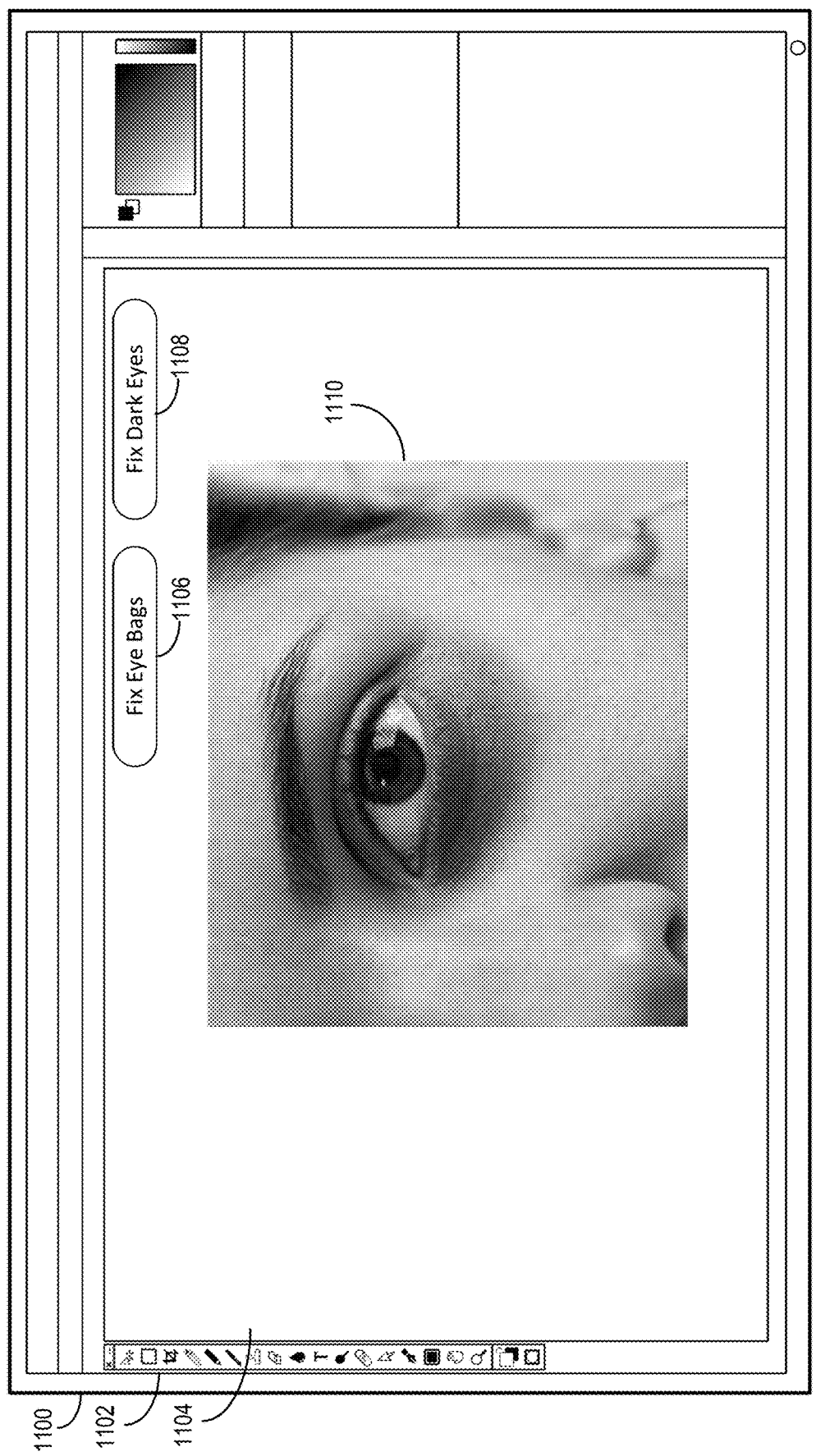
FIGS. 11A-11B illustrate a series of graphical user interfaces presenting various options for automatically correcting eye region artifacts in accordance with one or more embodiments of the present disclosure.
Figure 11B:
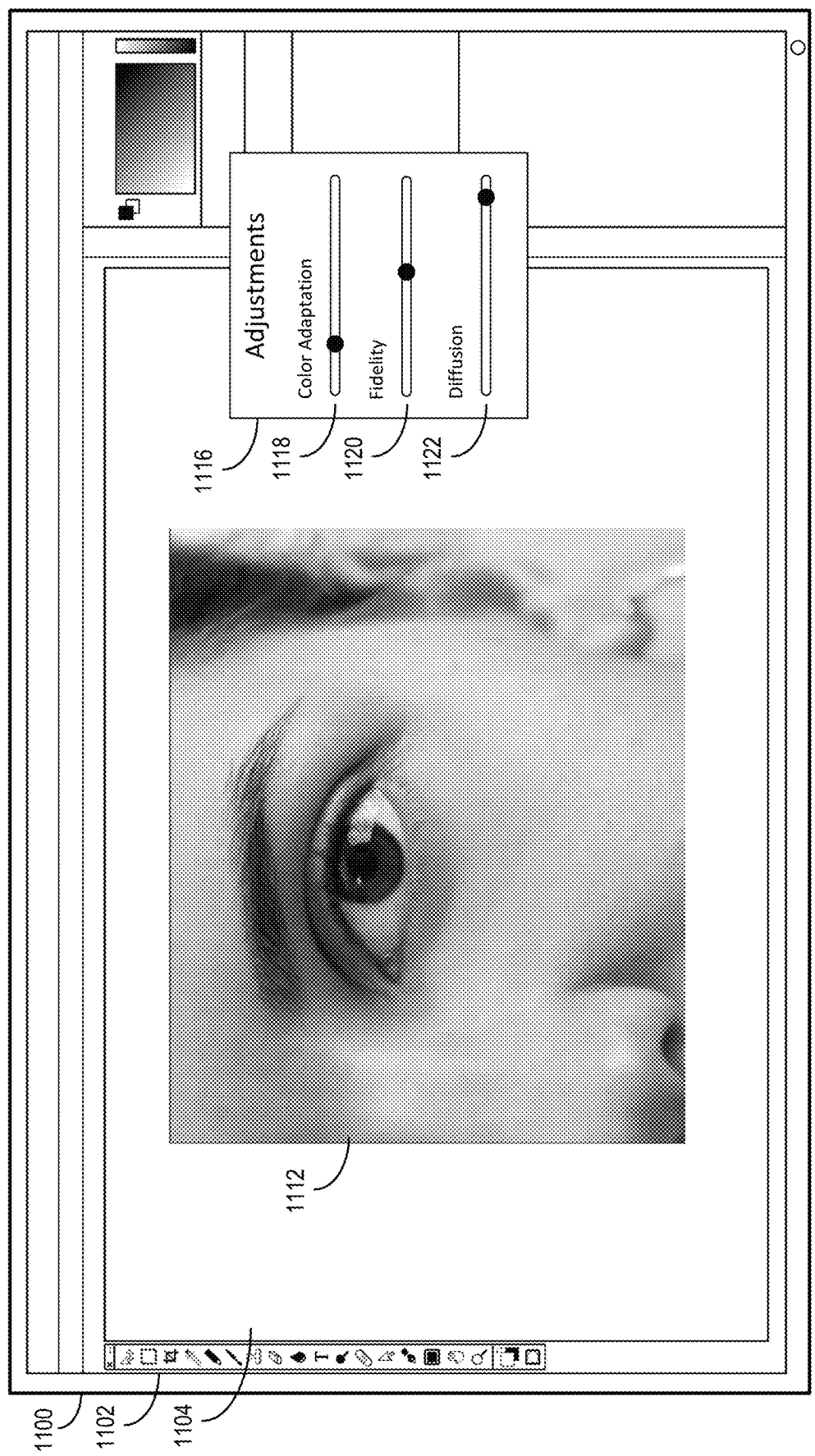

As mentioned, the eye region correction system 106 provides an intuitive graphical user interface to automatically correct eye region artifacts. FIGS. 11A-11B illustrate an example eye region correction user interface in accordance with one or more embodiments. FIG. 11A illustrates an eye region correction user interface 1104 on a screen 1102 of a client device 1100. The eye region correction user interface 1104 includes a wrinkle edge correction element 1106, a dark eye region correction element 1108, and a digital image 1110.

As illustrated in FIG. 11A, the eye region correction system 106 provides the wrinkle edge correction element 1106 for display via the eye region correction user interface 1104. Based on receiving an indication of user selection of the wrinkle edge correction element 1106, the eye region correction system 106 automatically processes the digital image 1110 to correct wrinkle edges. In particular, the eye region correction system 106 automatically generates a corrected texture image and combines (e.g., adds) the corrected texture image with a color layer of the digital image 1110 to generate a corrected digital image. In one or more embodiments, the eye region correction system 106 corrects wrinkle edges in real time based on user selection of the wrinkle edge correction element 1106.

As further illustrated in FIG. 11A, the eye region correction system 106 provides the dark eye region correction element 1108 for display via the eye region correction user interface 1104. Based on an indication of user selection of the dark eye region correction element 1108, the eye region correction system 106 automatically processes the digital image 1110 to correct dark eye regions in the digital image 1110. In particular, based on a selection of the dark eye region correction element 1108, the eye region correction system 106 automatically generates a corrected color image and combines the corrected color image with a texture layer of the digital image 1110 to generate a corrected digital image. In one or more embodiments, the eye region correction system 106 corrects dark eye regions in real time based on user selection of the dark eye region correction element 1108.

In some embodiments, the eye region correction system 106 automatically corrects dark eye regions alone or wrinkle edges alone based on user selection of the corresponding dark eye region correction element 1108 or the wrinkle edge correction element 1106. Additionally, based on selection of both the dark eye region correction element 1108 and the wrinkle edge correction element 1106, the eye region correction system 106 automatically corrects both. Though not illustrated in FIG. 11A, in some embodiments, the eye region correction system 106 provides, for display via the eye region correction user interface 1104, an eye region correction element associated with correcting a combination of both dark eye regions and wrinkle edges. For instance, instead of requiring users to select both the dark eye region correction element 1108 and the wrinkle edge correction element 1106, the eye region correction system 106 provides an eye region correction element by which the eye region correction system 106 corrects both types of eye region artifacts.

Based on user selection of one or both of the wrinkle edge correction element 1106 and the dark eye region correction element 1108, the client device 1100 updates the eye region correction user interface 1104 to present the corrected digital image. FIG. 11B illustrates the eye region correction user interface 1104 including a corrected digital image 1112. In particular, FIG. 11B illustrates the eye region correction user interface 1104 on the screen 1102 of the client device 1100. As illustrated in FIG. 11B, the eye region correction user interface 1104 also includes a manual adjustment element 1116 including a color adaptation adjustment element 1118, a fidelity adjustment element 1120, and a diffusion adjustment element 1122.

As illustrated in FIG. 11B, the eye region correction user interface 1104 includes the corrected digital image 1112. In one or more embodiments, the corrected digital image 1112 comprises the final corrected digital image after the eye region correction system 106 automatically corrected the dark eye regions and wrinkle edges. In some embodiments, the corrected digital image 1112 comprises a real-time display of the digital image that reflects parameter modifications. For instance, the corrected digital image 1112 reflects effects of parameter modifications made by the eye region correction system 106 or manual adjustments entered by a user of the client device 1100.

As further illustrated in FIG. 11B, the eye region correction user interface 1104 includes a manual adjustment element 1116. The manual adjustment element 1116 provides various user interface elements to adjust parameters utilized in generating the corrected digital image 1112. For example, a user may manually adjust sliders within the manual adjustment element 1116 to enhance the corrected digital image 1112. As illustrated, the manual adjustment element 1116 includes various adjustment elements. In particular, the manual adjustment element 1116 includes the color adaptation adjustment element 1118, the fidelity adjustment element 1120, and the diffusion adjustment element 1122.

In some embodiments, the manual adjustment element 1116 is associated with manual adjustments that the eye region correction system 106 applies to the corrected digital image as a whole, a corrected color image, or a corrected texture image. In some embodiments, the eye region correction system 106 provides a layer selection element associated with the manual adjustment element 1116. Based on user interaction with the layer selection element, the eye region correction system 106 provides, for display via the manual adjustment element 1116, manual adjustment elements for parameters associated with a color layer or a texture layer of the corrected digital image 1112.

Figure 12:
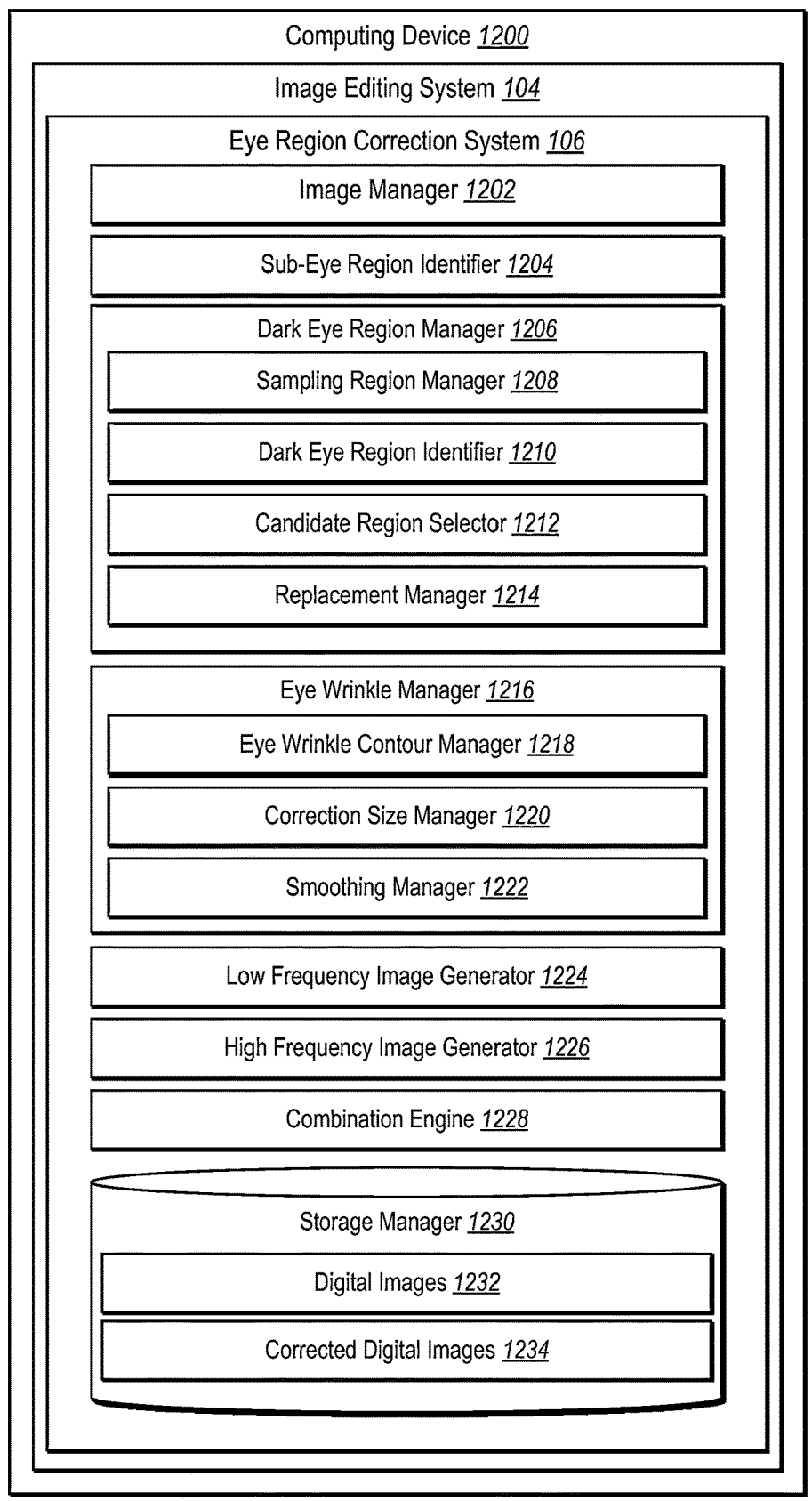
FIG. 12 illustrates a schematic diagram of an example architecture of the eye region correction system in accordance with one or more embodiments of the present disclosure.

FIG. 12 provides additional detail regarding various components and capabilities of the eye region correction system 106 in accordance with one or more embodiments. Generally, FIG. 12 illustrates the eye region correction system 106 implemented by the image editing system 104 on the computing device 1200 (e.g., the user client device 108 and/or the server device(s) 102). As shown, the eye region correction system 106 can include, but is not limited to, an image manager 1202, a sub-eye region identifier 1204, a dark eye region manager 1206, an eye wrinkle manager 1216, a low frequency image generator 1224, a high frequency image generator 1226, a combination engine 1228, and a storage manager 1230. In some embodiments, the eye region correction system 106 is implemented as part of the image editing system 104 in a distributed system of the server devices for generating and editing digital images. Additionally, or alternatively, the eye region correction system 106 is implemented on a single computing device such as the user client device 108 of FIG. 1.

In one or more embodiments, each of the components of eye region correction system 106 are in communication with one another using any suitable communication technologies. Additionally, the components of the eye region correction system 106 can be in communication with one or more other devices including the user client device 108 illustrated in FIG. 1. Although the components of the eye region correction system 106 are shown as separate in FIG. 12, any of the subcomponents may be combined into fewer components, such as into a single component or divided into more components as may serve a particular implementation. Furthermore, although the components of FIG. 12 are described in connection with the eye region correction system 106, at least some components for performing operations in conjunction with the eye region correction system 106 described herein may be implemented on other devices within the environment.

The components of the eye region correction system 106 can include software, hardware, or both. For example, the components of the eye region correction system 106 can include one or more instructions stored on a computer-readable storage medium and executable by processors of one or more computing devices (e.g., the user client device 108). When executed by the one or more processors, the computer-executable instructions of the eye region correction system 106 can cause the computing devices to perform the composite image generation methods described herein. Alternatively, the components of the eye region correction system 106 can comprise hardware, such as a special purpose processing device to perform a certain function or group of functions. Additionally, or alternatively, the components of the eye region correction system 106 can include a combination of computer-executable instructions and hardware.

Furthermore, the components of the eye region correction system 106 performing the functions described herein with respect to the eye region correction system 106 may, for example, be implemented as part of a stand-alone application, as a module of an application, as a plug-in for applications, as a library function or functions that may be called by other applications, and/or as a cloud-computing model. Thus, the components of the eye region correction system 106 may be implemented as part of a stand-alone application on a personal computing device or a mobile device. Alternatively, or additionally, the components of the eye region correction system 106 may be implemented in any application that provides three-dimensional image rendering, including, but not limited to ADOBE® PHOTOSHOP®, ADOBE® INDESIGN®, or LIGHTROOM® software. "ADOBE", "PHOTOSHOP," "INDESIGN" and "LIGHTROOM," are either registered trademarks or trademarks of Adobe Inc. in the United States and/or other countries.

Figure 16:
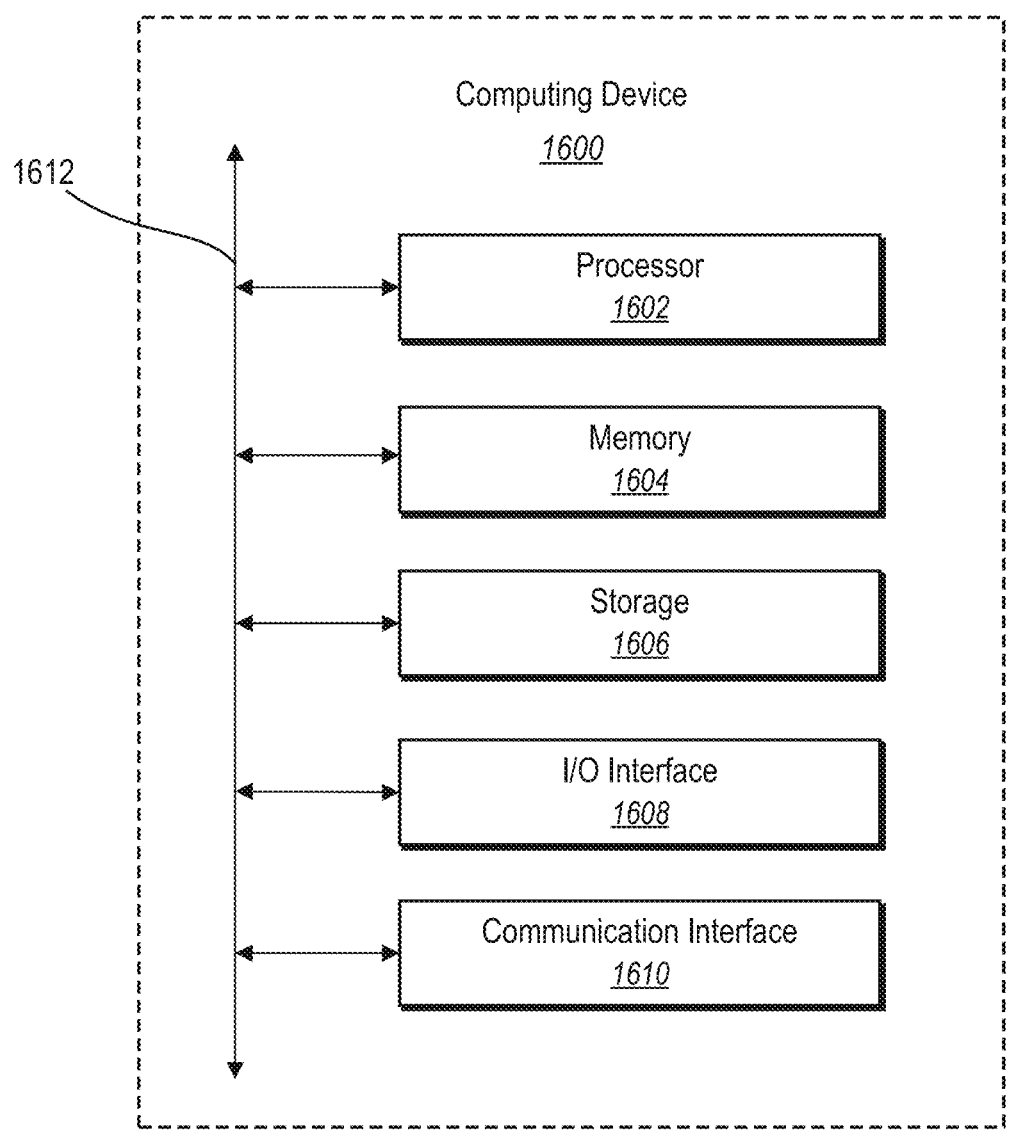
FIG. 16 illustrates a block diagram of an example computing device in accordance with one or more embodiments of the present disclosure.

As shown in FIG. 12, the eye region correction system 106 is located on the computing device 1200 within the image editing system 104. In general, the computing device 1200 represents various types of client devices. For example, in some embodiments, the computing device 1200 comprises a non-mobile device, such as a desktop or server, or another type of client device. FIG. 16 and the corresponding discussion provide additional details with regard to the computing device 1200.

The eye region correction system 106 includes the image manager 1202. The image manager 1202 receives, stores, generates, edits, and manages digital images. For instance, the image manager 1202 receives and organizes digital images portraying faces. Additionally, or alternatively, the image manager 1202 can extract digital images. For example, based on receiving a digital video, the image manager 1202 extracts digital images at predetermined intervals. The image manager 1202 also stores, edits, and manages metadata associated with the digital images. In particular, the image manager 1202 stores metadata including the time a digital image was captured and the order of digital images within a sequence of digital images.

The eye region correction system 106 also includes a sub-eye region identifier 1204. In particular, the sub-eye region identifier identifies sub-eye regions within digital images. More specifically, the sub-eye region identifier accesses and utilizes a landmark detection algorithm to generate facial landmarks for a digital image. The sub-eye region identifier 1204 stores data relating to sub-eye regions. For example, the sub-eye region identifier 1204 designates particular facial landmarks as sub-eye landmark points. Furthermore, the sub-eye region identifier 1204 determines and stores the sub-eye regions for a digital image.

The eye region correction system 106 includes a dark eye region manager 1206. Generally, the dark eye region manager 1206 identifies and stores data regarding a dark eye region within a digital image. The dark eye region manager 1206 includes various components such as a sampling region manager 1208, a dark eye region identifier 1210, a candidate region selector 1212, and a replacement manager 1214.

The sampling region manager 1208 identifies and stores data relating to one or more sampling areas within a digital image. In particular, the sampling region manager 1208 designates facial landmarks as sampling landmark points. The sampling region manager 1208 also identifies and stores data for sampling landmark points located on a digital image. Furthermore, the sampling region manager 1208 determines and stores a color of a sampling area. More particularly, the sampling region manager 1208 determines a set of sample colors from identified sampling landmark points and combines the set of sample colors.

The dark eye region manager 1206 illustrated in FIG. 12 also includes the dark eye region identifier 1210. In particular, the dark eye region identifier 1210 determines and stores data relating to dark eye regions within identified sub-eye regions within a digital image. More specifically, the dark eye region manager 1206 accesses a color of a sampling area and compares the color of the sampling area with pixels in the sub-eye region. In one or more embodiments, the dark eye region manager 1206 accesses and utilizes a color matching algorithm for determining a dark eye region within a sub-eye region. Furthermore, the dark eye region manager 1206 generates, manages, and stores data for identified dark eye regions.

The dark eye region manager 1206 further includes the candidate region selector 1212. The candidate region selector 1212 determines a candidate replacement region. In particular, the candidate region selector 1212 for identifies potential candidate replacement regions. Furthermore, the candidate region selector 1212 evaluates potential candidate replacement regions to determine a candidate replacement region associated with a dark eye region. For instance, the candidate region selector 1212 determines whether pixels within a potential candidate replacement region fall within a threshold range of pixel values. Furthermore, the candidate region selector 1212 determines whether a color of pixels for the potential candidate replacement region satisfies a threshold candidate color value.

Furthermore the dark eye region manager 1206 includes the replacement manager 1214. The replacement manager 1214 stores and utilizes processes required to replace a dark eye region with a candidate replacement region. In particular, the replacement manager 1214 generates a corrected color image by replacing a dark eye region with a candidate eye region. More specifically, the replacement manager 1214 stores and manages parameters associated with replacing the dark eye region as well as smoothing a path around a candidate replacement region and the surrounding pixels.

As further illustrated in FIG. 12, the eye region correction system 106 also includes an eye wrinkle manager 1216. Generally, the eye wrinkle manager 1216 stores and utilizes data for correcting wrinkles within sub-eye regions of digital images. The eye wrinkle manager 1216 includes various components such as an eye wrinkle contour manager 1218, a correction size manager 1220, and a smoothing manager 1222.

As illustrated in FIG. 12, the eye wrinkle manager 1216 includes the eye wrinkle contour manager 1218. Generally, the eye wrinkle contour manager 1218 identifies wrinkle edges and generates corresponding eye wrinkle contours. More specifically, the eye wrinkle contour manager 1218 utilizes an edge detection algorithm to identify wrinkle edges within a sub-eye region. Furthermore, the wrinkle contour manager 1218 stores and performs morphological operations on the identified wrinkle edges to generate the eye wrinkle contours.

As mentioned, the eye wrinkle manager 1216 illustrated in FIG. 12 also includes the correction size manager 1220. In particular, the correction size manager 1220 determines and stores data pertaining to correction sizes associated with each eye wrinkle contour. For example, in one or more embodiments, the correction size manager analyzes an eye wrinkle contour to determine a width of the eye wrinkle contour. The correction size manager 1220 further determines a correction size based on the width and length of the eye wrinkle contour.

The eye wrinkle manager 1216 further includes the smoothing manager 1222. Generally, the smoothing manager 1222 generates a corrected texture image by processing eye wrinkle contours within a digital image. In particular, the smoothing manager 1222 accesses and utilizes a smoothing algorithm based on a correction size. In one example, the smoothing manager 1222 utilizes a smoothing algorithm to replace pixels within an area of the correction size with different pixels (e.g., sample pixels) in the digital image.

As illustrated in FIG. 12, the eye region correction system 106 also includes the low frequency image generator 1224. Generally, the low frequency image generator 1224 creates and stores low frequency images. In particular, the low frequency image generator 1224 utilizes a blur algorithm to generate a low frequency image corresponding to a color layer of the digital image. Additionally, the low frequency image generator 1224 stores data associated with the generated low frequency images. For instance, the low frequency image generator 1224 stores data identifying a low frequency image and associated the low frequency image with the corresponding digital image.

The eye region correction system 106 also includes the high frequency image generator 1226. The high frequency image generator 1226 generates and stores high frequency images corresponding to a texture layer of a digital image. In some embodiments, the high frequency image generator 1226 generates high frequency images by subtracting a corresponding low frequency image from a digital image.

The eye region correction system 106 further includes a combination engine 1228. The combination engine 1228 generates corrected digital images by combining corrected texture images with corresponding corrected color images.

As illustrated in FIG. 12, the eye region correction system 106 includes a storage manager 1230. The storage manager 1230 stores (via one or more memory devices) digital images 1232 and corrected digital images 1234.

The storage manager 1230 includes the digital images 1232. In particular, the digital images 1232 includes digital images received by the eye region correction system 106. In some embodiments, the digital images 1232 include individual digital images portraying one or more faces as well as video data received by the eye region correction system.

The storage manager 1230 also includes the corrected digital images 1234. The corrected digital images 1234 includes corrected digital images generated by the eye region correction system 106. In particular, the corrected digital images 1234 includes individual layers or components of corrected digital images. For instance, for a single corrected digital image, the corrected digital images 1234 includes a corrected color image and/or a corrected texture image.

Figure 13:
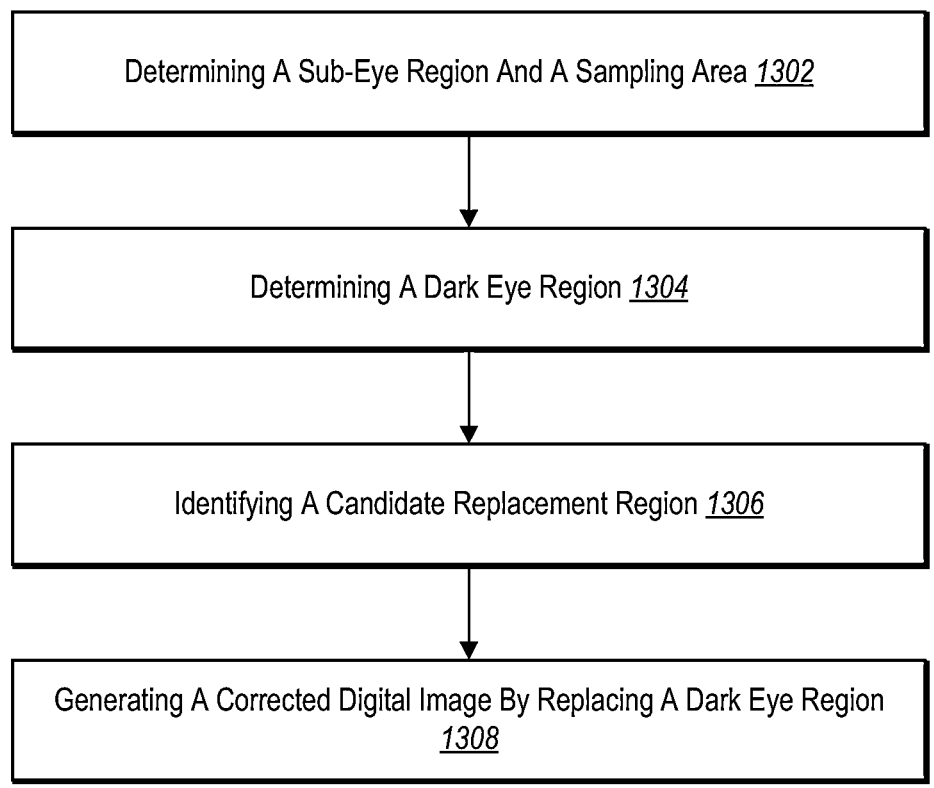
FIG. 13 illustrates a series of acts for generating a corrected digital image by replacing a dark eye region in accordance with one or more embodiments of the present disclosure.
Figure 14:
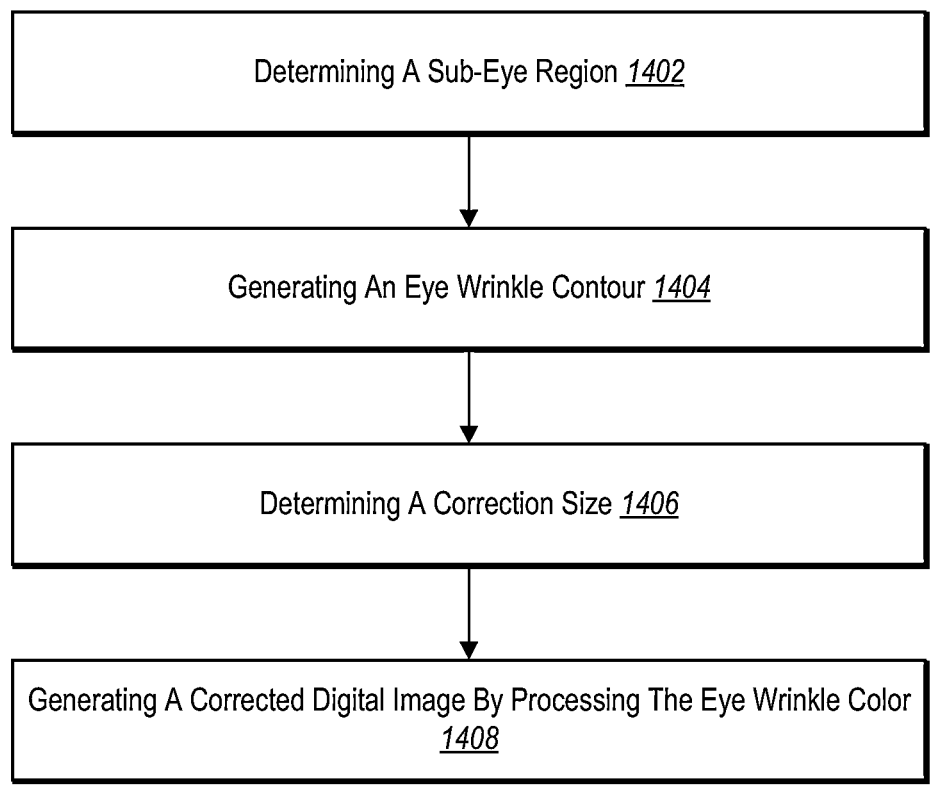
FIG. 14 illustrates a series of acts for generating a corrected digital image by processing an eye wrinkle contour in accordance with one or more embodiments of the present disclosure.
Figure 15:
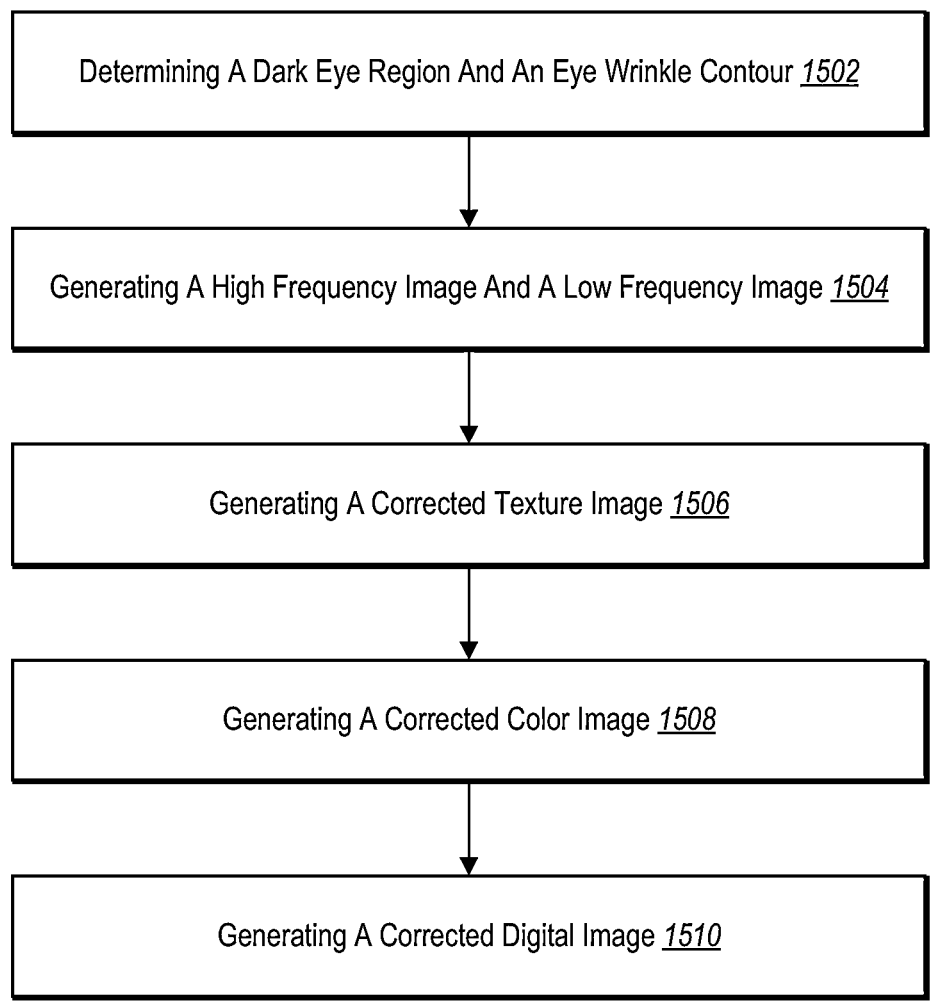
FIG. 15 illustrates a series of acts for generating a corrected digital image in accordance with one or more embodiments of the present disclosure.

FIGS. 1-12, the corresponding text, and the examples provide a number of different methods, systems, devices, and non-transitory computer-readable media of the eye region correction system 106. In addition to the foregoing, one or more embodiments can also be described in terms of flowcharts comprising acts for accomplishing the particular result, as shown in FIGS. 13-15. The acts illustrated in FIGS. 13-15 may be performed with more or fewer acts. Further, the illustrated acts may be performed in different orders. Additionally, the acts described herein may be repeated or performed in parallel with one another or in parallel with different instances of the same or similar acts.

FIG. 13 illustrates a flowchart of a series of acts 1300 for generating a corrected digital image by replacing a dark eye region. In particular, the series of acts 1300 includes an act 1302 of determining a sub-eye region and a sampling area, an act 1304 of determining a dark eye region, an act 1306 of identifying a candidate replacement region, and an act 1308 of generating a corrected digital image by replacing a dark eye region.

As illustrated in FIG. 13, the series of acts 1300 includes the act 1302 of determining a sub-eye region and a sampling area. In particular, the act 1302 comprises determining a sub-eye region of the digital image and a sampling area of the digital image from facial landmarks generated utilizing a facial landmark detection algorithm. In one or more embodiments, the act 1302 further comprises determining the sampling area of the digital image by: generating, utilizing the facial landmark detection algorithm, sampling landmark points from the digital image; determining a set of sample colors from the sampling landmark points; and combining the set of sample colors to determine the color of the sampling area. Additionally, in one or more embodiments, the act 1302 further comprises determining the dark eye region by: generating, utilizing the facial landmark detection algorithm, sub-eye landmark points from the digital image; determining the sub-eye region from the sub-eye landmark points; and generating the dark eye region by determining that a difference between the color of the sampling area and a pixel in the sub-eye region satisfies a color difference threshold.

The series of acts 1300 also includes the act 1304 of determining a dark eye region. In particular, the act 1304 comprises determining a dark eye region within the sub-eye region by comparing a color of the sampling area with pixels in the sub-eye region.

The series of acts 1300 includes the act 1306 of identifying a candidate replacement region. In particular, the act 1306 comprises identifying a candidate replacement region from the digital image by sampling the digital image utilizing the dark eye region and the color of the sampling area. In one or more embodiments, the act 1306 further comprises identifying the candidate replacement region by: determining a potential candidate replacement region comprising a shape of the dark eye region in a location that is a distance from the dark eye region; determining a color of pixels for the potential candidate replacement region; and determining that a difference between the color of pixels for the potential candidate replacement region and the color of the sampling area satisfies a threshold candidate color value. Additionally, in one or more embodiments, the act 1306 further comprises determining that the candidate replacement region does not contain artifacts by: utilizing a color matching algorithm to process pixels within the potential candidate replacement region; and determining that the pixels within the potential candidate replacement region fall within a threshold range of pixel values.

The series of acts 1300 further includes the act 1308 of generating a corrected digital image by replacing a dark eye region. In particular, the act 1308 comprises generating a corrected digital image by replacing the dark eye region with the candidate replacement region.

In some embodiments, the series of acts 1300 further comprises additional acts of generating a low frequency image by processing the digital image utilizing a blur algorithm; and generating the corrected digital image by replacing the dark eye region with the candidate replacement region in the low frequency image.

Furthermore, in some embodiments, the series of acts 1300 further comprises additional acts of generate a path around the candidate replacement region; and upon replacing the dark eye region with the candidate replacement region, process the path around the candidate replacement region utilizing a smoothing algorithm.

FIG. 14 illustrates a flowchart of a series of acts 1400 for generating a corrected digital image by processing an eye wrinkle contour. In particular, the series of acts 1400 includes an act 1402 of determining a sub-eye region, an act 1404 of generating an eye wrinkle contour, an act 1406 of determining a correction size, and an act 1408 of generating a corrected digital image by processing the eye wrinkle contour.

As illustrated in FIG. 14, the series of acts 1400 includes the act 1402 of determining a sub-eye region. In particular, the act 1402 comprises determining a sub-eye region of a digital image portraying a face from facial landmarks generated utilizing a facial landmark detection algorithm.

As further illustrated in FIG. 14, the series of acts 1400 includes the act 1404 of generating an eye wrinkle contour. In particular, the act 1404 comprises generating an eye wrinkle contour from the sub-eye region by processing the digital image utilizing an edge detection algorithm. In one or more embodiments, the act 1404 further comprises generating the eye wrinkle contour by: identifying a wrinkle edge by processing the sub-eye region utilizing the edge detection algorithm; and generating one or more closed contours around the wrinkle edge by processing the wrinkle edge utilizing morphological operations.

The series of acts 1400 illustrated in FIG. 14 further comprises the act 1406 of determining a correction size. In particular, the act 1406 comprises determining a correction size based on a width of the eye wrinkle contour.

As further illustrated in FIG. 14, the series of acts 1400 includes the act 1408 of generating a corrected digital image by processing the eye wrinkle contour. In particular, the act 1408 comprises generating a corrected digital image by processing the eye wrinkle contour utilizing a smoothing algorithm and the correction size. In one or more embodiments, the act 1408 further comprises the act of generating the corrected digital image by: determining a classification for the face of the digital image, wherein the classification comprises at least one of an age classification or a gender classification; and based on the classification, modifying a parameter for generating the corrected digital image. Additionally, in one or more embodiments, the act 1408 further comprises an act of generating the corrected digital image utilizing the smoothing algorithm by replacing pixels of an area corresponding to the correction size with sample pixels from the digital image.

Additionally, in one or more embodiments the smoothing algorithm comprises a fidelity parameter, and the act 1408 further comprises providing, for display via a client device, a manual adjustment element comprising a fidelity adjustment element; and based on user interaction with the fidelity adjustment element, modifying the fidelity parameter of the smoothing algorithm and smoothness of the eye wrinkle contour.

In one or more embodiments, the series of acts 1400 further includes the acts of generating a high frequency image and a low frequency image from the digital image utilizing a blur algorithm; and generating the corrected digital image by processing the eye wrinkle contour on the high frequency image utilizing the smoothing algorithm.

FIG. 15 illustrates a flowchart of a series of acts 1500 for generating a corrected digital image. In particular, the series of acts 1500 includes an act 1502 of determining a dark eye region and an eye wrinkle contour, an act 1504 of generating a high frequency image and a low frequency image, an act 1506 of generating a corrected texture image, an act 1508 of generating a corrected color image, and an act 1510 of generating a corrected digital image.

As illustrated in FIG. 15, the series of acts 1500 includes the act 1502 of determining a dark eye region and an eye wrinkle contour. In particular, the act 1502 comprises determining, within a digital image portraying a face, a dark eye region and an eye wrinkle contour. In one or more embodiments, the act 1502 comprises determining the eye wrinkle contour by: identifying a wrinkle edge by processing a sub-eye region utilizing an edge detection algorithm; and generating one or more closed contours around the wrinkle edge by processing the wrinkle edge utilizing morphological operations. Furthermore, in one or more embodiments, the act 1502 comprises determining the dark eye region by: generating, utilizing the facial landmark detection algorithm, sub-eye landmark points from the digital image; determining the sub-eye region from the sub-eye landmark points; and generating the dark eye region by determining that a difference between the sample color of the sampling area and a pixel in the sub-eye region satisfies a color difference threshold.

As further illustrated in FIG. 15, the series of acts 1500 includes the act 1504 of generating a high frequency image and a low frequency image. In particular, the act 1504 comprises generating a high frequency image and a low frequency image corresponding to the digital image portraying the face.

The series of acts 1500 illustrated in FIG. 15 further comprises the act 1506 of generating a corrected texture image. In particular, the act 1506 comprises generating a corrected texture image by smoothing pixels along the eye wrinkle contour of the high frequency image.

As illustrated in FIG. 15, the series of acts 1500 includes the act 1508 of generating a corrected color image. In particular, the act 1508 comprises generating a corrected color image by replacing the dark eye region with a candidate replacement region of the low frequency image.

The series of acts 1500 illustrated in FIG. 15 further comprises the act 1510 of generating a corrected digital image. In particular, the act 1510 comprises generating a corrected digital image by combining the corrected texture image and the corrected color image.

In one or more embodiments, the series of acts 1500 further comprises additional acts of generating the low frequency image by processing the digital image utilizing a blur algorithm; and generating the high frequency image by separating the low frequency image from the digital image.

Additionally, in one or more embodiments, the series of acts 1500 further comprises additional acts of providing, for display at a client device, a manual adjustment element comprising adjustment elements comprising at least one of: a fidelity adjustment element, a color adaptation adjustment element, and a diffusion adjustment element; and modifying the corrected digital image based on user interaction with the adjustment elements.

Furthermore, in one or more embodiments, the series of acts 1500 further comprises additional acts of determining a classification for the face of the digital image; and based on the classification, modifying a parameter for generating the corrected texture image and a parameter for generating the corrected color image. In some embodiments, determining the classification comprises determining at least one of an age classification or a gender classification.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 16 illustrates a block diagram of a computing device 1600 that may be configured to perform one or more of the processes described above. One will appreciate that one or more computing devices such as the computing device 1600 may implement the eye region correction system 106 and the image editing system 104. As shown by FIG. 16, the computing device 1600 can comprise a processor 1602, a memory 1604, a storage device 1606, an I/O interface 1608, and a communication interface 1610, which may be communicatively coupled by way of a communication infrastructure 1612. In certain embodiments, the computing device 1600 can include fewer or more components than those shown in FIG. 16. Components of the computing device 1600 shown in FIG. 16 will now be described in additional detail.

In one or more embodiments, the processor 1602 includes hardware for executing instructions, such as those making up a computer program. As an example, and not by way of limitation, to execute instructions for dynamically modifying workflows, the processor 1602 may retrieve (or fetch) the instructions from an internal register, an internal cache, the memory 1604, or the storage device 1606 and decode and execute them. The memory 1604 may be a volatile or non-volatile memory used for storing data, metadata, and programs for execution by the processor(s). The storage device 1606 includes storage, such as a hard disk, flash disk drive, or other digital storage device, for storing data or instructions for performing the methods described herein.

The I/O interface 1608 allows a user to provide input to, receive output from, and otherwise transfer data to and receive data from computing device 1600. The I/O interface 1608 may include a mouse, a keypad or a keyboard, a touch screen, a camera, an optical scanner, network interface, modem, other known I/O devices or a combination of such I/O interfaces. The I/O interface 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1608 is configured to provide graphical data to a display for presentation to a user. The graphical data may be representative of one or more graphical user interfaces and/or any other graphical content as may serve a particular implementation.

The communication interface 1610 can include hardware, software, or both. In any event, the communication interface 1610 can provide one or more interfaces for communication (such as, for example, packet-based communication) between the computing device 1600 and one or more other computing devices or networks. As an example, and not by way of limitation, the communication interface 1610 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1610 may facilitate communications with various types of wired or wireless networks. The communication interface 1610 may also facilitate communications using various communication protocols. The communication infrastructure 1612 may also include hardware, software, or both that couples components of the computing device 1600 to each other. For example, the communication interface 1610 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A system comprising:
   at least one memory device comprising a digital image portraying a face; and at least one computing device configured to cause the system to:

determine a sub-eye region of the digital image and a sampling area of the digital image from facial landmarks generated utilizing a facial landmark detection algorithm;

determine a dark eye region within the sub-eye region by comparing a color of the sampling area with pixels in the sub-eye region;

identify a candidate replacement region from the digital image by sampling the digital image utilizing the dark eye region and the color of the sampling area; and generate a corrected digital image by replacing the dark eye region with the candidate replacement region.

2. The system as recited in claim 1, wherein the at least one computing device is further configured to cause the system to determine the sampling area of the digital image by:

generating, utilizing the facial landmark detection algorithm, sampling landmark points from the digital image;

determining a set of sample colors from the sampling landmark points; and combining the set of sample colors to determine the color of the sampling area.

3. The system as recited in claim 2, wherein the at least one computing device is further configured to cause the system to determine the dark eye region by:

generating, utilizing the facial landmark detection algorithm, sub-eye landmark points from the digital image;

determining the sub-eye region from the sub-eye landmark points; and generating the dark eye region by determining that a difference between the color of the sampling area and a pixel in the sub-eye region satisfies a color difference threshold.

4. The system as recited in claim 1, wherein the at least one computing device is further configured to cause the system to:

generate a low frequency image by processing the digital image utilizing a blur algorithm; and generate the corrected digital image by replacing the dark eye region with the candidate replacement region in the low frequency image.

5. The system as recited in claim 1, wherein the at least one computing device is further configured to identify the candidate replacement region by:

determining a potential candidate replacement region comprising a shape of the dark eye region in a location that is a distance from the dark eye region;

determining a color of pixels for the potential candidate replacement region; and determining that a difference between the color of pixels for the potential candidate replacement region and the color of the sampling area satisfies a threshold candidate color value.

6. The system as recited in claim 5, wherein the at least one computing device is further configured to determine that the potential candidate replacement region does not contain artifacts by:

utilizing a color matching algorithm to process pixels within the potential candidate replacement region; and determining that the pixels within the potential candidate replacement region fall within a threshold range of pixel values.

7. The system as recited in claim 1, wherein the at least one computing device is further configured to:

generate a path around the candidate replacement region; and upon replacing the dark eye region with the candidate replacement region, process the path around the candidate replacement region utilizing a smoothing algorithm.

8. A non-transitory computer readable medium for generating corrected eye region images comprising instructions that, when executed by at least one processor, cause a computing device to:

determine a sub-eye region of a digital image portraying a face from facial landmarks generated utilizing a facial landmark detection algorithm;

generate an eye wrinkle contour from the sub-eye region by processing the digital image utilizing an edge detection algorithm;

determine a correction size based on a width of the eye wrinkle contour; and generate a corrected digital image by processing the eye wrinkle contour utilizing a smoothing algorithm and the correction size.

9. The non-transitory computer readable medium as recited in claim 8, further comprising instructions that, when executed by the at least one processor, cause the computing device to generate the corrected digital image by:

determining a classification for the face of the digital image, wherein the classification comprises at least one of an age classification or a gender classification; and based on the classification, modifying a parameter for generating the corrected digital image.

10. The non-transitory computer readable medium as recited in claim 9, further comprising instructions that, when executed by the at least one processor, cause the computing device to generate the corrected digital image utilizing the smoothing algorithm by replacing pixels of an area corresponding to the correction size with sample pixels from the digital image.

11. The non-transitory computer readable medium as recited in claim 8, further comprising instructions that, when executed by the at least one processor, cause the computing device to generate the eye wrinkle contour by:

identifying a wrinkle edge by processing the sub-eye region utilizing the edge detection algorithm; and generating one or more closed contours around the wrinkle edge by processing the wrinkle edge utilizing morphological operations.

12. The non-transitory computer readable medium as recited in claim 8, further comprising instructions that, when executed by the at least one processor, cause the computing device to:

generate a high frequency image and a low frequency image from the digital image utilizing a blur algorithm; and generate the corrected digital image by processing the eye wrinkle contour on the high frequency image utilizing the smoothing algorithm.

13. The non-transitory computer readable medium as recited in claim 8, wherein the smoothing algorithm comprises a fidelity parameter and further comprising instructions that, when executed by the at least one processor, cause the computing device to:

provide, for display via a client device, a manual adjustment element comprising a fidelity adjustment element; and based on user interaction with the fidelity adjustment element, modify the fidelity parameter of the smoothing algorithm and smoothness of the eye wrinkle contour.

14. In a digital medium environment for correcting eye region artifacts, a computer-implemented method comprising:

determining, within a digital image portraying a face, a dark eye region and an eye wrinkle contour;

generating a high frequency image and a low frequency image corresponding to the digital image portraying the face;

generating a corrected texture image by smoothing pixels along the eye wrinkle contour of the high frequency image;

generating a corrected color image by replacing the dark eye region with a candidate replacement region of the low frequency image; and generating a corrected digital image by combining the corrected texture image and the corrected color image.

15. The method as recited in claim 14, further comprising:

generating the low frequency image by processing the digital image utilizing a blur algorithm; and generating the high frequency image by separating the low frequency image from the digital image.

16. The method as recited in claim 14, further comprising:

providing, for display at a client device, a manual adjustment element comprising adjustment elements comprising at least one of: a fidelity adjustment element, a color adaptation adjustment element, and a diffusion adjustment element; and modifying the corrected digital image based on user interaction with the adjustment elements.

17. The method as recited in claim 14, further comprising:

determining a classification for the face of the digital image; and based on the classification, modifying a parameter for generating the corrected texture image and a parameter for generating the corrected color image.

18. The method as recited in claim 17, wherein determining the classification comprises determining at least one of an age classification or a gender classification.

19. The method as recited in claim 14, further comprising determining the eye wrinkle contour by:

identifying a wrinkle edge by processing a sub-eye region utilizing an edge detection algorithm; and generating one or more closed contours around the wrinkle edge by processing the wrinkle edge utilizing morphological operations.

20. The method as recited in claim 14, further comprising determining the dark eye region by:

generating, utilizing a facial landmark detection algorithm, sub-eye landmark points from the digital image;

determining the sub-eye region from the sub-eye landmark points; and generating the dark eye region by determining that a difference between a sample color of a sampling area and a pixel in the sub-eye region satisfies a color difference threshold.

* * * * *